(12) United States Patent
Ajellal et al.

(10) Patent No.: US 11,702,487 B2
(45) Date of Patent: Jul. 18, 2023

(54) PROCESS FOR PREPARING PROPYLENE POLYMERS

(71) Applicant: BOREALIS AG, Vienna (AT)

(72) Inventors: Noureddine Ajellal, Porvoo (FI); Ville Virkkunen, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/049,989

(22) PCT Filed: May 7, 2019

(86) PCT No.: PCT/EP2019/061633
§ 371 (c)(1),
(2) Date: Oct. 23, 2020

(87) PCT Pub. No.: WO2019/215120
PCT Pub. Date: Nov. 14, 2019

(65) Prior Publication Data
US 2021/0230319 A1 Jul. 29, 2021

(30) Foreign Application Priority Data
May 9, 2018 (EP) .................... 18171547

(51) Int. Cl.
| C08F 210/16 | (2006.01) |
| C08F 4/64 | (2006.01) |
| C08F 10/06 | (2006.01) |
| C08F 4/642 | (2006.01) |

(52) U.S. Cl.
CPC .......... *C08F 10/06* (2013.01); *C08F 4/64003* (2013.01); *C08F 4/6428* (2013.01); *C08F 210/16* (2013.01); *C08F 2420/07* (2021.01); *C08F 2500/03* (2013.01); *C08F 2500/12* (2013.01); *C08F 2500/17* (2013.01); *C08F 2500/18* (2013.01); *C08L 2207/02* (2013.01)

(58) Field of Classification Search
CPC . C08F 4/64003; C08F 4/6428; C08F 2420/07
See application file for complete search history.

(56) References Cited

U.S. PATENT DOCUMENTS

| 11,078,304 | B2 * | 8/2021 | Resconi | ............ | C08F 4/65927 |
| 2015/0259442 | A1 | 9/2015 | Kallio et al. | | |
| 2015/0337060 | A1 * | 11/2015 | Castro | .................... | C08F 110/06 |
| | | | | | 526/133 |
| 2019/0308995 | A1 * | 10/2019 | Ajellal | ................. | C08F 4/65927 |
| 2020/0131284 | A1 * | 4/2020 | Resconi | ..................... | C08F 2/01 |
| 2020/0369861 | A1 * | 11/2020 | Gahleitner | .............. | C08L 23/12 |

FOREIGN PATENT DOCUMENTS

| CN | 104854143 | A | | 8/2015 | |
| CN | 104870487 | A | | 8/2015 | |
| EP | 2722346 | A1 | | 4/2014 | |
| EP | 2829556 | B1 | | 11/2016 | |
| EP | 2829558 | B1 | | 12/2016 | |
| EP | 2722344 | B1 | | 3/2017 | |
| EP | 2722345 | B1 | | 12/2018 | |
| JP | 2009533382 | A | | 9/2009 | |
| JP | 2015536357 | A | | 12/2015 | |
| JP | 2015536358 | A | | 12/2015 | |
| KR | 20170068474 | A | | 6/2017 | |
| KR | 20170073463 | A | | 6/2017 | |
| KR | 20170073463 | A | * | 6/2017 | ............ C08F 210/06 |
| WO | 199414856 | A1 | | 7/1994 | |
| WO | 199512622 | A1 | | 5/1995 | |
| WO | 200202576 | A1 | | 1/2002 | |
| WO | 2003051934 | A3 | | 6/2003 | |
| WO | 2006069733 | A1 | | 7/2006 | |
| WO | 2006097497 | A1 | | 9/2006 | |
| WO | 2007116034 | A1 | | 10/2007 | |
| WO | 2010052260 | A1 | | 5/2010 | |
| WO | 2010052263 | A1 | | 5/2010 | |
| WO | 2010052264 | A1 | | 5/2010 | |
| WO | 2011076780 | A1 | | 6/2011 | |
| WO | 2011135004 | A2 | | 11/2011 | |
| WO | 2012001052 | A3 | | 3/2012 | |
| WO | 2012084961 | A1 | | 6/2012 | |
| WO | 2013007650 | A1 | | 1/2013 | |
| WO | 2014060540 | A1 | | 4/2014 | |
| WO | 2014060541 | A1 | | 4/2014 | |
| WO | 2015158790 | A2 | | 10/2015 | |

OTHER PUBLICATIONS

Nifant'ev, I. E. et al. "5-Methoxy-Substituted Zirconium Bisindenyl ansa-Complexes: Synthesis, Structure, and Catalytic Activity in the Polymerization and Copolymerization of Alkenes". Organometallics 2012, 31(14), 4962-4970. (Year: 2012).*

Ilya E. Nifant'ev et al., "5-Methoxy-Substituted Zirconium Bisindenyl ansa-Complexes: Synthesis, Structure, and Catalytic Activity in the Polymerization and Copolymerization of Alkenes", Organometallics, vol. 31, No. 14; Jul. 23, 2012, pp. 4962-4970, XP055060553, ISSN: 0276-7333, DOI: 10.1021/om300160v the whole document.

Applicant: Borealis AG; "Process for Preparing Propylene Polymers"; European Application No. EP18171547, European Filing Date: May 9, 2018; Extended European Search Report; dated Nov. 7, 2018; 8 pgs.

Andreas Endres and Gerhard Maas; "Die fluorige Phase: Organische Chemie mit hochfluorierten Reagenzien und Lösungsmitteln"; Organische Chemie; Chemie in unserer Zeit; 34 Jahrg. 2000;12 pgs.

(Continued)

*Primary Examiner* — Richard A Huhn
(74) *Attorney, Agent, or Firm* — Tarolli, Sundheim, Covell & Tummino L.L.P.

(57) ABSTRACT

The present invention relates to a process for producing a propylene polymer, such as a propylene homopolymer, a propylene-ethylene random copolymer or a heterophasic propylene copolymer using a specific class of metallocene complexes in combination with a cocatalyst system comprising a boron containing cocatalyst and an aluminoxane cocatalyst, preferably in a multistage polymerization process including a gas phase polymerization step.

13 Claims, No Drawings

(56) References Cited

OTHER PUBLICATIONS

Vincenzo Busico, et al.; "Alk-1-ene Polymerization in the Presence of a Monocyclopentadienyl Zirconium(iv) Acetamidinate Catalyst: Microstructural and Mechanistic Insights"; Macromolecular Rapid Communications Journals, Wiley InterScience DOI: 10.1002/marc. 200700098; Macromol. Rapid Commun. 2007, 28, pp. 1128-1134.

H. N. Cheng, "C NMR Analysis of Ethylene-Propylene Rubberts"; Macromolecules, vol. 17, No. 10, Oct. 1, 1984; https://doi.org/10.1021/ma00140a012; 6 pgs.

Pierandrea Lo Nostro; "Phase separation properties of fluorocarbons, hydrocarbons and their copolymers"; Advances in Colloid and Interface Science vol. 56, Mar. 29, 1995, pp. 245-287.

Luigi Resconi, Luigi Cavallo, Anna Fait, and Fabrizio Piemontesi; "Selectivity in Propene Polymerization with Metallocene Catalysts"; Chem. Rev. 2000, 100, 4; Mar. 25, 2000; https://doi.org/10.1021/cr980469; pp. 1253-1346.

Gurmeet Singh, Ajay V. Kothari, Virendra K. Gupta; "Triad Sequence Determination of Ethylene-Propylene Copolymers—Application of Quantitative C NMR"; ScienceDirect Polymer Testing; www.elsevier.com/locate/polytest; Feb. 27, 2009; 5 pp.

Wen-Jun Wang and Shiping Zhu; "Structural Analysis of Ethylene/Propylene Copolymers Sunthesized with a Constrained Geometry Catalyst"; Macromolecules 2000; Received Dec. 9, 1999; pp. 1157-1162.

Zhe Zhou, et al.; "A new decoupling method for accurate quantification of polyethylene copolymer composition and triad sequence distribution with C NMR"; ScienceDirect www.sciencedirect.com Journal of Magnetic Resonance 187 May 23, 2007; pp. 225-233.

Japanese Notice of Reasons for Rejection; Japanese Patent Application No. 2021-501099; dated Aug. 3, 2021; 5 pgs.

Ilya E. Nifant'ev, et al.; "5-Methoxy-Substituted Zirconium Bisindenyl ansa-Complexes: Synthesis, Structure, and Catalytic Activity in the Polymerization and Copolymerization of Alkenes"; Organometallics 2012 31 (14), 4962-4970 DOI: 10.1021/om300160v.

Applicant: Borealis AGE; "Process for Producing Propylene Polymer"; Chinese Application No. 201980021569.7, Chinese Office Action dated Aug. 8, 2022, 20 pgs.

* cited by examiner

PROCESS FOR PREPARING PROPYLENE POLYMERS

The present invention relates to a process for producing a propylene polymer, such as a propylene homopolymer, a propylene-ethylene random copolymer or a heterophasic propylene copolymer using a specific class of metallocene complexes in combination with a cocatalyst system comprising a boron containing cocatalyst and an aluminoxane cocatalyst, preferably in a multistage polymerization process including a gas phase polymerization step. The invention further relates to the use of catalysts which comprise a specific class of metallocene complexes in combination with a cocatalyst system comprising a boron containing cocatalyst and an aluminoxane cocatalyst to produce a propylene polymer, such as a propylene homopolymer, propylene-ethylene random copolymer or a heterophasic propylene copolymer, preferably in a multistep process including a gas phase polymerization step.

BACKGROUND OF THE INVENTION

Metallocene catalysts have been used to manufacture polyolefins for many years. Countless academic and patent publications describe the use of these catalysts in olefin polymerization. Metallocenes are now used industrially and polyethylenes and polypropylenes in particular are often produced using cyclopentadienyl based catalyst systems with different substitution patterns.

Metallocene catalysts are used in propylene polymerization in order to achieve some desired polymer properties.

However, there are some problems in using metallocene catalysts on industrial scale especially in multistage polymerization configurations.

Thus, there is room for improving the process and catalyst behaviour in the process.

The mechanical properties of isotactic polypropylene (iPP) homopolymers depend largely on their thermal properties, and these are in turn largely determined by the amount of stereo- and regiodefects distributed randomly along the polymer chain. Even with high pentad isotacticities, low melting temperature ($T_m$) can be found in metallocene i-PP polymers due to low regioregularity.

Interestingly, it has been observed that melting behaviour of i-PP polymer can be changed by applying boron activators (EP 2 722 344). It has been found that addition of a borate as co-activators to the catalyst formulation increases the Tm of hPP by several degrees, by reducing the frequency of regiodefects. Furthermore, the use of borate activators is known to improve catalyst activity in propylene homopolymerization, in C3/C2 random copolymerization and in the gas phase steps (EP 2 722 345, EP 2 722 346, EP 2 829 556 and EP 2 829 558).

As described above, high performance catalysts can be formulated using the metallocene catalysts with borate coactivator. However, compared to aluminoxane coactivation, the catalysts formulated with borate coactivator show reduced molecular weight capability especially in C3/C2 copolymerization and therefore limit the performance of the catalysts for heterophasic copolymers. Therefore it continues to be a problem to formulate a high performance catalyst which provides high Tm, high activity and high molecular weight capability and that can be applied for production of heterophasic PP.

Thus it is desired to find metallocene catalyst systems, which have improved performance in the production of propylene-ethylene copolymers, for instance having high activity for high Mw propylene random copolymer products.

The desired catalysts should also have improved performance in the production of high molecular weight propylene homopolymers and propylene random copolymers, especially propylene-ethylene random copolymers, whereby the propylene homopolymers and propylene random copolymers should have higher melting points compared to homopolymers and propylene random copolymers produced with metallocene catalyst systems of the prior art.

Although a lot of work has been done in the field of metallocene catalysts, there still remain some problems, which relate mainly to the productivity or activity of the catalysts, in particular in multistage polymerization processes, since the productivity or activity has been found to be relatively low, especially when polymers of low melt index (MI) (i.e. high molecular weight, Mw) are produced.

The inventors have identified a catalyst system composed of a specific class of metallocene catalysts in combination with a cocatalyst system comprising a boron containing cocatalyst and an aluminoxane cocatalyst having improved polymerization behaviour, higher catalyst productivity, improved performance in the production of high molecular weight propylene homopolymers and propylene random copolymers with higher melting points compared to systems known in the art, and reduced chain transfer to ethylene, enabling the production of propylene-ethylene copolymers at high Mw, thus being ideal for the production of high molecular weight propylene homopolymers, propylene random copolymers, especially propylene-ethylene random copolymers, and also suitably heterophasic propylene copolymers. The specific catalyst system gives a higher flexibility/freedom in the design of propylene polymers than prior art catalyst systems.

SUMMARY OF THE INVENTION

The present invention provides a process for polymerizing propylene monomers, optionally together with ethylene comonomers, in the presence of a single-site catalyst comprising (i) a complex of formula (I)

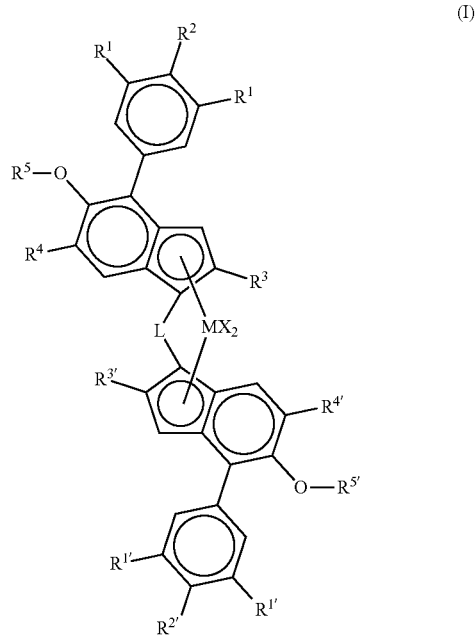

wherein

M is zirconium or hafnium;

each X independently is a sigma-donor ligand

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing one or more heteroatoms of Group 14-16 of the periodic table or fluorine atoms, or optionally two R' groups taken together can form a ring;

R$^1$ and R$^{1'}$ are each independently hydrogen, C$_5$-C$_{10}$-aryl or a group —CH(R$^x$)$_2$ wherein each R$^x$ is independently H or a C$_1$-C$_{10}$ hydrocarbyl group, and optionally the two R$^x$ taken together can form a ring, R$^2$ and R$^{2'}$ are each independently hydrogen, C$_5$-C$_{10}$-aryl or a group —C(R$^y$)$_3$ wherein each R$^y$ is independently H or a C$_{1-10}$ hydrocarbyl group, or optionally two or three R$^y$ groups taken together can form a ring whereby at least one of R$^1$ or R$^2$ and one of R$^{1'}$ or R$^{2'}$ is different from hydrogen and whereby R$^2$ together with one of R$^1$, as well as R$^{2'}$ together with one of R$^{1'}$ can be part of a further mono- or multicyclic ring condensed to the phenyl ring R$^3$ and R$^{3'}$ are each independently a linear C$_1$ to C$_6$ hydrocarbyl group or a branched or cyclic C$_4$ to C$_{10}$ hydrocarbyl group, whereby the groups are not branched in α-position R$^4$ and R$^{4'}$ are each independently a tertiary C$_4$ to C$_{10}$ hydrocarbyl group R$^5$ and R$^{5'}$ are each independently a linear or branched C$_1$ to C$_{10}$ alkyl group or an C$_5$-C$_{10}$-aryl group and (ii) a cocatalyst system comprising a boron containing cocatalyst and an aluminoxane cocatalyst.

The catalysts according to the invention are especially suitable in a multistage process comprising at least two reactors connected in series including at least one gas phase polymerization step.

The catalyst of the invention can be used in non-supported form or in solid form. The catalyst of the invention may be used as a homogeneous catalyst or heterogeneous catalyst.

The catalyst of the invention in solid form, preferably in solid particulate form can be either supported on an external carrier material, like silica or alumina, or, in a particularly preferred embodiment, is free from an external carrier, however still being in solid form. For example, the solid catalyst is obtainable by a process in which (x) a liquid/liquid emulsion system is formed, said liquid/liquid emulsion system comprising a solution of the catalyst components (i) and (ii) dispersed in a solvent so as to form dispersed droplets; and (xx) solid particles are formed by solidifying said dispersed droplets.

In another aspect the present invention relates to a polymer of propylene obtainable from the process according to the present invention as defined above or below which comprises a homopolymer of propylene or a random copolymer of propylene and ethylene.

Finally, the present invention also relates to the use of a single-site catalyst comprising (i) a complex of formula (I)

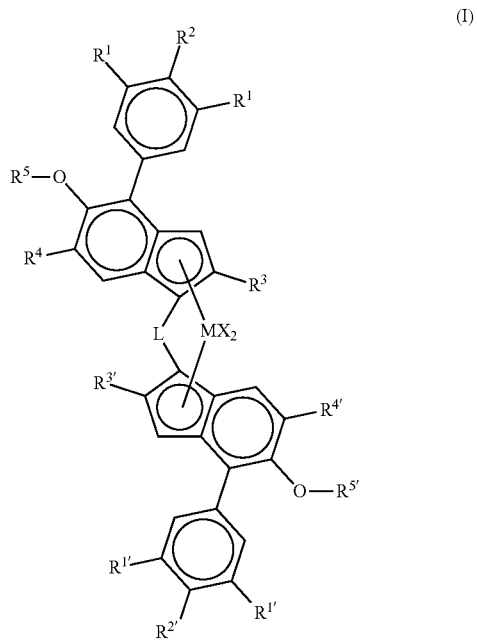

wherein

M is zirconium or hafnium;

each X independently is a sigma-donor ligand

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing one or more heteroatoms of Group 14-16 of the periodic table or fluorine atoms, or optionally two R' groups taken together can form a ring;

R$^1$ and R$^{1'}$ are each independently hydrogen, C$_5$-C$_{10}$-aryl or a group —CH(R$^x$)$_2$ wherein each R$^x$ is independently H or a C$_{1-10}$ hydrocarbyl group, and optionally the two R$^x$ taken together can form a ring, R$^2$ and R$^{2'}$ are each independently hydrogen, C$_5$-C$_{10}$-aryl or a group —C(R$^y$)$_3$ wherein each R$^y$ is independently H or a C$_{1-10}$ hydrocarbyl group, or optionally two or three R$^y$ groups taken together can form a ring whereby at least one of R$^1$ or R$^2$ and one of R$^{1'}$ or R$^{2'}$ is different from hydrogen and whereby R$^2$ together with one of R$^1$, as well as R$^{2'}$ together with one of R$^{1'}$ can be part of a further mono- or multicyclic ring condensed to the phenyl ring R$^3$ and R$^{3'}$ are each independently a linear C$_1$ to C$_6$ hydrocarbyl group or a branched or cyclic C$_4$ to C$_{10}$ hydrocarbyl group, whereby the groups are not branched in α-position R$^4$ and R$^{4'}$ are each independently a tertiary C$_4$ to C$_{10}$ hydrocarbyl group R$^5$ and R$^{5'}$ are each independently a linear or branched C$_1$ to C$_{10}$ alkyl group or an C$_5$-C$_{10}$-aryl group and (ii) a cocatalyst system comprising a boron containing cocatalyst and an aluminoxane cocatalyst, for the production of a polymer of propylene obtainable from the process according the present invention as defined above or below.

DETAILED DESCRIPTION OF THE INVENTION

The complexes and hence catalysts of the invention are based on formula (I) as hereinbefore defined which, inter alia, combines the use of the indenyl ring structure with non-H substituents at the 2-, 4-, 5- and 6-positions.

The complexes of the invention can be asymmetrical or symmetrical. Asymmetrical means simply that the two indenyl ligands forming the metallocene are different, that is, each indenyl ligand bears a set of substituents that are either chemically different, or located in different positions with respect to the other indenyl ligand. Symmetrical complexes are based on two identical indenyl ligands.

Preferably the complexes used according to the invention are symmetrical.

The complexes of the invention are chiral, racemic bridged bisindenyl metallocenes. The metallocenes of the invention are either $C_2$-symmetric or $C_1$-symmetric. When they are $C_1$-symmetric they still maintain a pseudo-$C_2$-symmetry since they maintain $C_2$-symmetry in close proximity of the metal center, although not at the ligand periphery. By nature of their chemistry, both a meso form and a racemic enantiomer pair (in case of $C_2$-symmetric complexes) or anti and syn enantiomer pairs (in case of $C_1$-symmetric complexes) are formed during the synthesis of the complexes. For the purpose of this invention, racemic or racemic-anti means that the two indenyl ligands are oriented in opposite directions with respect to the cyclopentadienyl-metal-cyclopentadienyl plane, while meso or racemic-syn means that the two indenyl ligands are oriented in the same direction with respect to the cyclopentadienyl-metal-cyclopentadienyl plane, as shown in the FIGURE below.

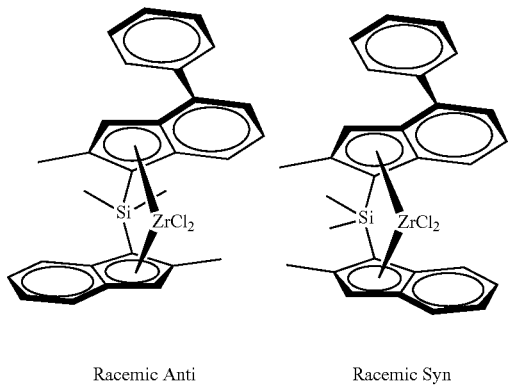

Racemic Anti          Racemic Syn

Formula (I) is intended to cover all these configurations.

It is preferred, that the metallocenes of the invention are employed as the racemic or racemic-anti isomers. Ideally therefore at least 95.0 mol %, such as at least 98.0 mol %, especially at least 99.0 mol % of the metallocene is in the racemic or racemic-anti isomeric form.

In the catalysts of the invention the following preferences apply:

M is zirconium or hafnium, preferably zirconium.

In the definitions below the term hydrocarbyl group includes alkyl groups, alkenyl groups, alkynyl groups, cycloalkyl groups, cycloalkenyl groups, aryl groups, alkylaryl groups or arylalkyl groups or of course mixtures of these groups such as cycloalkyl substituted by alkyl.

Each X independently is a sigma-donor ligand.

Thus each X independently may be the same or different, and is preferably a hydrogen atom, a halogen atom, a linear or branched, cyclic or acyclic $C_1$-$C_{20}$-alkyl or -alkoxy group, a $C_6$-$C_{20}$-aryl group, a $C_7$-$C_{20}$-alkylaryl group or a $C_7$-$C_{20}$-arylalkyl group; optionally containing optionally containing one or more heteroatoms of Group 14-16 of the periodic table.

The term halogen includes fluoro, chloro, bromo and iodo groups, preferably chloro groups. The term heteroatoms belonging to groups 14-16 of the periodic table includes for example Si, N, O or S.

More preferably each X is independently a hydrogen atom, a halogen atom, a linear or branched $C_1$-$C_6$-alkyl or $C_1$-$C_6$-alkoxy group, a phenyl or benzyl group.

Yet more preferably each X is independently a halogen atom, a linear or branched $C_1$-$C_4$-alkyl or $C_1$-$C_4$-alkoxy group, a phenyl or benzyl group.

Most preferably each X is independently chlorine, benzyl or a methyl group.

Preferably both X groups are the same.

The most preferred options for both X groups are two chlorides, two methyl or two benzyl groups.

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, and optionally two R' groups taken together can form a ring.

The term heteroatoms belonging to groups 14-16 of the periodic table includes for example Si, N, O or S.

Preferably L is dimethylsilyl, methylcyclohexylsilyl (i.e. Me-Si-cyclohexyl), ethylene or methylene.

$R^1$ and $R^{1'}$ are each independently hydrogen, $C_5$-$C_{10}$-aryl or a group —CH(R$^x$)$_2$ wherein each R$^x$ is independently H or a $C_1$-$C_{10}$ hydrocarbyl group, and optionally the two R$^x$ taken together can form a ring, $R^2$ and $R^{2'}$ are each independently hydrogen, $C_5$-$C_{10}$-aryl or a group —C(R$^y$)$_3$ wherein each R$^y$ is independently H or a $C_1$-$C_{10}$ hydrocarbyl group, or optionally two or three R$^y$ groups taken together can form a ring.

At least one of $R^1$ or $R^2$ and one of $R^{1'}$ or $R^{2'}$ is different from hydrogen. This means that the phenyl-groups in position 4 of both indenyl ligands are substituted by at least one substitutent different from hydrogen.

The phenyl-groups in position 4 of both indenyl ligands can therefore be substituted by one, two or three substitutents different from hydrogen.

In another embodiments $R^2$ together with one of $R^1$, as well as $R^{2'}$ together with one of $R^{1'}$ can be part of a further mono- or multicyclic ring condensed to the phenyl ring. The new ring is preferably 5 or 6 membered or the groups preferably form two new rings such as one further five membered and six membered ring.

The new ring or rings can be aliphatic or aromatic.

In this way groups such as 2-naphthyl, 5- or 6-(indanyl), 5- or 6-(1,1-dialkyl-1H-indenyl), 6-(1,2,3,4-tetrahydronaphthyl), 6-(1,1,4,4-tetramethyl-1,2,3,4-tetrahydronaphthyl), 5- or 6-(N-alkyl-indolyl), 5- or 6-(N-alkylindolinyl), 2- or 3-(N-alkylcarbazolyl), 5- or 6-benzothiophenyl can be formed.

Preferably $R^1$ and $R^{1'}$ are the same and are either hydrogen or group —CH(R$^x$)$_2$ wherein each R$^x$ is independently either H or a $C_{1-3}$ hydrocarbyl group.

More preferably $R^1$ and $R^{1'}$ are either hydrogen or a group —CH(R$^x$)$_2$ wherein each R$^x$ is H, i.e. the group being methyl.

Preferably $R^2$ and $R^{2'}$ are also the same and are either hydrogen or group —$C(R^y)_3$ wherein each $R^y$ is either H or a $C_1$-$C_3$ hydrocarbyl group.

More preferably $R^2$ and $R^{2'}$ are either hydrogen or a group —$C(R^y)_3$ wherein each $R^y$ is a $C_1$-alkyl group, i.e. the group being a tert-butyl group.

It is especially preferred that in the complex of the formula (I) either $R^1$ and $R^{1'}$ or $R^2$ and $R^{2'}$ are hydrogen.

In this case the phenyl-groups in position 4 of both indenyl ligands are both substituted either in position 4' of the phenyl groups or in position 3' and 5' of the phenyl groups.

It is within the scope of the invention for the two 4-phenyl groups to be different (e.g. 3,5-dimethylphenyl on one indene and 3,5-di-ethylphenyl on the other) or the same.

Alternatively, the two 3,5-substituents on each 4-phenyl group can be different (e.g. 3-methyl-5-propyl) or the same.

It is preferred if the two 3,5-substituents on each phenyl group are the same. It is preferred if the two 4-position phenyl groups are the same. More preferably the 4-phenyl groups are the same on both ligands and that both 3,5-substituents are the same.

Even more preferred is that the phenyl-groups in position 4 of the indenyl ligands are either both a 3,5-dimethyl-phenyl ($3,5$-$Me_2Ph$) group or both are a 4-tert-butyl-phenyl (4-tBu-Ph) group.

$R^3$ and $R^{3'}$ are each independently a linear $C_1$-$C_6$ hydrocarbyl group or a branched or cyclic $C_4$-$C_{10}$ hydrocarbyl group, whereby the groups are not branched in α-position.

Suitable examples for linear $C_1$-$C_6$ hydrocarbyl are alkyl groups like methyl, ethyl, n-propyl, n-butyl, n-propyl and n-hexyl.

Suitable examples for branched or cyclic $C_4$-$C_{10}$ hydrocarbyl groups, which are not branched in α-position are benzyl, iso-butyl, isopentyl, isohexyl, 2-(cyclohexylmethyl), etc.

Preferably $R^3$ and $R^{3'}$ are a linear $C_1$-$C_4$ alkyl group, more preferably a $C_1$-$C_2$ alkyl group and even more preferably a methyl group.

$R^3$ and $R^{3'}$ may be the same or different, preferably they are the same.

$R^4$ and $R^{4'}$ are each independently a tertiary $C_4$-$C_{10}$ hydrocarbyl group.

Suitable examples for tertiary $C_4$-$C_{10}$ hydrocarbyl groups are tert-butyl, 1-adamantyl, 1,1-dimethylbenzyl, etc.

Preferably $R^4$ and $R^{4'}$ are a tertiary $C_4$-$C_6$ alkyl group, more preferably a tert-butyl. $R^4$ and $R^{4'}$ may be the same or different, preferably they are the same.

$R^5$ and $R^{5'}$ are each independently a linear or branched $C_1$-$C_{10}$ alkyl group or an $C_5$-$C_{10}$-aryl group.

Preferably $R^5$ and $R^{5'}$ are each independently a linear or branched $C_1$-$C_6$ alkyl group or a phenylgroup and more preferably a linear $C_1$-$C_4$ alkyl group.

Even more preferably $R^5$ and $R^{5'}$ are the same and most preferably $R^5$ and $R^{5'}$ are both methyl.

Particular compounds of the invention include:
rac-$Me_2Si(2$-$Me$-$4$-$(3,5$-$Me_2Ph)$-$5$-$OMe$-$6$-$tBu$-$Ind)_2$ $ZrCl_2$ and
rac-$Me_2Si(2$-$Me$-$4$-$(4$-$tBu$-$Ph)$-$5$-$OMe$-$6$-$tBu$-$Ind)_2ZrCl_2$ For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780 and WO2015/158790. The examples section also provides the skilled person with sufficient direction.

Cocatalyst

To form an active catalytic species it is normally necessary to employ a cocatalyst as is well known in the art.

According to the present invention a cocatalyst system comprising a boron containing cocatalyst as well as an aluminoxane cocatalyst is used in combination with the above defined complex.

The aluminoxane cocatalyst can be one of formula (X):

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_3$-$C_{10}$-cycloalkyl, $C_7$-$C_{12}$-arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention the aluminoxane cocatalyst is used in combination with a boron containing cocatalyst.

Boron based cocatalysts of interest include those of formula (Z)

wherein Y independently is the same or can be different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate anion. Such ionic cocatalysts preferably contain a non-coordinating anion such as tetrakis (pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N, N-dimethylanilinium.

Preferred ionic compounds which can be used according to the present invention include: triethylammoniumtetra (phenyl)borate, tributylammoniumtetra(phenyl)borate, trimethylammoniumtetra(tolyl)borate, tributylammoniumtetra (tolyl)borate, tributylammoniumtetra(pentafluorophenyl) borate, tripropylammoniumtetra(dimethylphenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl) borate, N,N-dimethylaniliniumtetra(phenyl)borate, N,N-diethylaniliniumtetra(phenyl)borate, N,N-dimethylaniliniumtetrakis(pentafluorophenyl)borate, N,N-di(propyl) ammoniumtetrakis(pentafluorophenyl)borate, di(cyclohexyl)ammoniumtetrakist(pentafluorophenyl)borate, triphenylphosphoniumtetrakis(phenyl)borate, triethylphosphoniumtetrakis(phenyl)borate, diphenylphosphoniumtetrakis(phenyl)borate, tri(methylphenyl) phosphoniumtetrakis(phenyl)borate, tri(dimethylphenyl) phosphoniumtetrakis(phenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

Suitable amounts of cocatalyst will be well known to the skilled man.

The molar ratio of boron to the metal ion of the metallocene may be in the range 0.5:1 to 10:1 mol/mol, preferably 0.8:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Catalyst Manufacture

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/ 14856 (Mobil), WO95/12622 (*Borealis*) and WO2006/ 097497. The particle size is not critical but is preferably in the range 5 to 200 μm, more preferably 20 to 80 μm. The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane previously dissolved in an aromatic solvent, or can be prepared by sequentially adding the dissolved catalyst components to the polymerization medium.

In one particularly preferred embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles. This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent. In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e.g. temperatures) used during the dispersing step.

The term "immiscible with the catalyst solution" means that the solvent (continuous phase) is fully immiscible or partly immiscible i.e. not fully miscible with the dispersed phase solution. Preferably said solvent is inert in relation to the compounds of the catalyst system to be produced. Full disclosure of the necessary process can be found in WO03/ 051934.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The process is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e. g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerized in a "prepolymerization" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. $C_3$-$C_{30}$, such as $C_4$-$C_{10}$. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr.6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultrasonic wave, or by using a so called phase change method for preparing the emulsion by first forming a homogeneous system which is then transferred by changing the temperature of the system to a biphasic system so that droplets will be formed. The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, NH2, NR"2. —COOH, —COONH2, oxides of alkenes, —CR"=CH2, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, NH2, NR"2. —COOH, —COONH2, oxides of alkenes, —CR"=CH2, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds.

Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e. g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences are typically of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e.g. be subjected to an immediate (within milliseconds to few seconds) temperature change in order to achieve an instant solidification of the component (s) within the droplets. The appropriate temperature change, i. e. an increase or a decrease in the temperature of an emulsion system, required for the desired solidification rate of the components cannot be limited to any specific range, but naturally depends on the emulsion system, i. a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e. g. as stated above, whereby said temperature change of the emulsion system is sufficient to cause the rapid solidification of the droplets. The receiving medium can be gaseous, e. g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e. g. perfluorinated hydrocarbon.

Alternatively, the temperature difference may be effected by gradual heating of the emulsion system, e. g. up to 10° C. per minute, preferably 0.5 to 6° C. per minute and more preferably in 1 to 5° C. per minute.

In case a melt of e. g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. organic solvents with fluorous solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire or only part of the droplet may be converted to a solid form.

The solid catalyst particles recovered can be used, after an optional washing step, in a polymerization process of an olefin. Alternatively, the separated and optionally washed solid particles can be dried to remove any solvent present in the particles before use in the polymerization step. The separation and optional washing steps can be effected in a known manner, e. g. by filtration and subsequent washing of the solids with a suitable solvent.

The droplet shape of the particles may be substantially maintained. The formed particles may have an average size range of 1 to 500 µm, e.g. 5 to 500 µm, advantageously 5 to 200 µm or 10 to 150 µm. Even an average size range of 5 to 60 µm is possible. The size may be chosen depending on the polymerization the catalyst is used for. Advantageously, the particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor. During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerization process.

All or part of the preparation steps can be done in a continuous manner. Reference is made to WO2006/069733 describing principles of such a continuous or semicontinuous preparation methods of the solid catalyst types, prepared via emulsion/solidification method.

Catalyst Prepolymerization ("Off-Line Prepolymerization")

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

As monomers in the catalyst prepolymerization step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene.

The catalyst prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst prepolymerization is done in fluorinated hydrocarbons, the temperature for the prepolymerization step is below 70° C., e.g. in the range of −30 to 70° C., preferably 0-65° C. and more preferably in the range 20 to 55° C.

Pressure within the prepolymerization vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerization vessel is preferably kept in an inert atmosphere, such as under nitrogen or argon or similar atmosphere. Prepolymerization is continued until the prepolymerization degree (DP) defined as weight of polymer matrix/weight of solid catalyst before prepolymerization step is reached. The degree is below 25, preferably 0.5 to 10.0, more preferably 1.0 to 8.0, most preferably 2.0 to 6.0.

Use of the catalyst prepolymerization step offers the advantage of minimising leaching of catalyst components and thus local overheating.

After prepolymerization, the catalyst can be isolated and stored.

The metallocene catalysts used according to the present invention possess excellent catalyst activity and good comonomer response. The catalysts are also able to provide heterophasic propylene polymers of high weight average molecular weight Mw.

Moreover, the random copolymerization behaviour of metallocene catalysts used according to the invention shows a reduced tendency of chain transfer to ethylene. Polymers obtained with the metallocenes of the invention have normal particle morphologies.

In general therefore the invention catalysts can provide:
high activity in bulk propylene polymerization;
high productivity in multistage polymerization;
very high molecular weight capability;
improved comonomer incorporation in propylene copolymers;
good polymer morphology.

Polymerization

The present invention relates to a process for producing a propylene polymer using the specific class of metallocene complexes in combination with a boron containing cocatalyst as well as with an aluminoxane cocatalyst, as defined above or below.

Said propylene polymer can comprise a propylene homopolymer or a propylene-ethylene random copolymer.

In one embodiment the propylene polymer is a propylene homopolymer.

In another embodiment the propylene polymer is a propylene-ethylene copolymer.

In still another embodiment the propylene polymer is a heterophasic propylene copolymer comprising a propylene homopolymer in the matrix phase and an elastomeric propylene copolymer in the elastomeric phase dispersed in said matrix phase.

In yet another embodiment the propylene polymer is a heterophasic propylene copolymer comprising propylene-ethylene random copolymer in the matrix phase and an elastomeric propylene copolymer in the elastomeric phase dispersed in said matrix phase.

The process can be a one-stage process in which the propylene polymer is polymerized in one polymerization reactor.

Preferably the process is a multistage polymerization process comprising at least two reactors connected in series preferably including a gas phase polymerization step.

Polymerization in the process of the invention preferably may be effected in at least two or more, e.g. 2, 3 or 4, polymerization reactors connected in series of which at least one reactor is preferably a gas phase reactor. The process may also involve a prepolymerization step.

This prepolymerization step is a conventional step used routinely in polymer synthesis and is to be distinguished from the catalyst prepolymerization step discussed above.

Preferably, the process of the invention employs two or three wherein at least one reactor is a gas phase reactor.

For polymerizing a propylene homopolymer or a propylene-ethylene random copolymer the process of the invention preferably employs one reactor, suitably for producing a unimodal propylene homopolymer or propylene-ethylene random copolymer, or two reactors connected in series wherein at least one reactor is a gas phase reactor, suitably for producing a bimodal propylene homopolymer or propylene-ethylene random copolymer. For the case of producing a multimodal propylene homopolymer or propylene-ethylene random copolymer the process according to the invention can also employ three or more reactors connected in series wherein at least one reactor is a gas phase reactor. Ideally the process of the invention for polymerizing a propylene homopolymer or a propylene-ethylene random copolymer employs a first reactor operating in bulk and optionally a second reactor being a gas phase reactor. Any optional additional subsequent reactor after the second reactor is preferably a gas phase reactor.

For polymerizing a heterophasic propylene copolymer the process according to the invention preferably employs two or three, more preferably three main reactors connected in series, wherein at least one reactor is a gas phase reactor. Ideally the process of the invention for polymerizing a heterophasic propylene copolymer employs a first reactor operating in bulk and a second and third reactors being gas phase reactors. Any optional additional subsequent reactor after the second reactor is preferably a gas phase reactor.

Where one bulk and two gas phase reactors are employed, a bulk reactor and the first gas phase reactor may each produce a propylene polymer component, whereby these two propylene polymer components from the bulk reactor and the first gas phase reactor form the matrix phase (M) of the heterophasic propylene copolymer. Thereby, the matrix phase (M) can consist of two propylene homopolymer components, two propylene-ethylene random copolymer components or one propylene homopolymer component and one propylene-ethylene random copolymer component. For the last embodiment the propylene homopolymer component and the propylene-ethylene random copolymer component can be polymerized in the bulk reactor and the first gas phase reactor in any order.

The elastomeric propylene copolymer is suitably polymerized in the second gas phase reactor in the presence of the matrix phase (M).

The process may also utilise a prepolymerization step. Bulk reactions may take place in a loop reactor.

For bulk and gas phase copolymerization reactions, the reaction temperature used will generally be in the range 60 to 115° C. (e.g. 70 to 90° C.), the reactor pressure will generally be in the range 10 to 25 bar for gas phase reactions with bulk polymerization operating at slightly higher pressures. The residence time will generally be 0.25 to 8 hours (e.g. 0.5 to 4 hours).

The gas used will be the monomer optionally as mixture with a non-reactive gas such as nitrogen or propane. It is a particular feature of the invention that polymerization takes place at temperatures of at least 60° C.

Generally the quantity of catalyst used will depend upon the nature of the catalyst, the reactor types and conditions and the properties desired for the polymer product. As is well known in the art hydrogen can be used for controlling the molecular weight of the polymer.

Splits between the various reactors can vary. When two reactors are used, splits are generally in the range of 30 to 70 wt % to 70 to 30 wt % bulk to gas phase, preferably 40 to 60 to 60 to 40 wt %. Where three reactors are used, it is preferred that each reactor preferably produces at least 20 wt % of the polymer, such as at least 25 wt %. The sum of the polymer produced in gas phase reactors should preferably exceed the amount produced in bulk.

In one embodiment of the present invention the process comprises the following steps:
 a) introducing propylene monomer units, optionally ethylene comonomer units and hydrogen into a polymerization reactor;
 b) polymerizing the propylene monomer units and optionally ethylene units to form a polymer of propylene which is selected from a propylene homopolymer or a random copolymer of propylene and ethylene.

This embodiment is especially suitable for the production of a propylene homopolymer or a propylene-ethylene random copolymer.

In said embodiment the process may further comprise the following steps:
 c) transferring the polymerization mixture from process step b) comprising the polymer of propylene which is selected from a propylene homopolymer or a random copolymer of propylene and ethylene into a second polymerization reactor;
 d) introducing propylene monomer units, optionally ethylene comonomer units and hydrogen into said second polymerization reactor;
 e) polymerizing the propylene monomer units and optionally ethylene comonomer units to form a second polymer of propylene which is selected from a propylene homopolymer or a random copolymer of propylene and ethylene in the presence of the polymer of propylene which is selected from a propylene homopolymer or a random copolymer of propylene and ethylene of process step b) in the presence of the single-site catalyst.

In another embodiment of the present invention the process comprises the following steps:

(A) polymerizing propylene monomer units and optionally ethylene comonomer units in the presence of hydrogen, in at least a first reactor and optionally a second reactor to form a propylene homopolymer component and/or a propylene-ethylene random copolymer component, said propylene homopolymer component and/or a propylene-ethylene random copolymer component forming the matrix phase (M) and (B) polymerizing propylene monomer units and ethylene comonomer units in a gas phase reactor in the presence of the matrix phase (M) prepared in step (A) so as to form a elastomeric propylene-ethylene copolymer component dispersed in said matrix phase (M).

This embodiment is especially suitable for the production of a heterophasic propylene copolymer.

Preferably the process of said embodiment comprises steps (A') to (E'), whereby (A') polymerizing in a first reactor propylene monomer units and optionally ethylene comonomer units in the presence of hydrogen for obtaining a first propylene homopolymer fraction (hPP1) or a first propylene-ethylene random copolymer fraction (cPP1), (B') transferring said first propylene homopolymer fraction (hPP1) or first propylene-ethylene random copolymer fraction (cPP1) in a second reactor, (C') polymerizing in said second reactor in the presence of the first propylene homopolymer fraction (hPP1) or first propylene-ethylene random copolymer fraction (cPP1) propylene monomer units and optionally ethylene comonomer units in the presence of hydrogen for obtaining a second propylene homopolymer fraction (hPP2) or a second propylene-ethylene random copolymer fraction (cPP2), said first propylene homopolymer fraction (hPP1) or first propylene-ethylene random copolymer fraction (cPP1) and said second propylene homopolymer fraction (hPP2) a second propylene-ethylene random copolymer fraction (cPP2) forming the matrix phase (M), (D') transferring said matrix phase (M) into a third reactor, said third reactor being a gas phase reactor, (E') polymerizing in said third reactor in the presence of the matrix (M) propylene monomer units and ethylene comonomer units for obtaining an elastomeric propylene copolymer (E), wherein said matrix (M) and said elastomeric propylene copolymer (E) form the heterophasic propylene copolymer.

It is preferred that in both process steps (A') and (C') propylene homopolymer fractions (hPP1) and (hPP2) are polymerized.

In the process of the present invention the propylene polymer is preferably polymerized in the presence of a chain transfer agent such as hydrogen.

Generally, the molar ratio of hydrogen to propylene $[H_2/C_3]$ is not particularly limited.

It is further preferred that in the first polymerization reactor of the embodiments discussed above in process steps b), (A) and (A') the molar ratio of ethylene to propylene $[C_2/C_3]$ is from 0 to 100 mol/kmol, more preferably from 0 to 75 mol/kmol.

The molar ratio of ethylene to propylene $[C_2/C_3]$ in any subsequent polymerization reactor for polymerizing a propylene-ethylene random copolymer can be in the same range as for the first polymerization reactor as discussed above.

During polymerization the single site catalyst preferably has a metallocene (MC) activity, determined with respect to the metallocene, of preferably at least 1000 kg of propylene polymer per g of the metallocene per hr of polymerization $(kg/g_{MC}/h)$, more preferably at least 1200 $kg/g_{MC}/h$, most preferably at least 14000 $kg/g_{MC}/h$. Usually the catalyst activity does not exceed 10000 $kg/g_{unprepolym.\ cat}/h$.

During polymerization the single site catalyst preferably has a catalyst activity, determined with respect to the unprepolymerized catalyst, of preferably at least 50 kg of propylene polymer per g of the unprepolymerized catalyst per hr of polymerization $(kg/g_{unprepolym.\ cat}/h)$, more preferably at least 65 $kg/g_{unprepolym.\ cat}/h$, most preferably at least 70 $kg/g_{unprepolym.\ cat}/h$. Usually the catalyst activity does not exceed 500 $kg/g_{unprepolym.\ cat}/h$.

During polymerization the single site catalyst preferably has an overall catalyst productivity, determined with respect to the unprepolymerized catalyst, is preferably at least 50 kg of propylene polymer per g of the unprepolymerized catalyst $(kg/g_{unprepolym.\ cat})$, more preferably at least 75 $kg/g_{unprepolym.\ cat}$, most preferably at least 100 $kg/g_{unprepolym.\ cat}$. Usually the overall catalyst productivity does not exceed 300 $kg/g_{unprepolym.cat}$ during the polymerization of the heterophasic propylene copolymer.

The overall catalyst productivity is determined over all polymerization stages.

Polymer

The present invention also relates to a polymer of propylene obtainable from the process according to the invention as described above and below.

Thereby, in one embodiment the polymer of propylene can comprise a homopolymer of propylene.

When polymerizing a homopopolymer of propylene with the single-site catalyst comprising the complex of formula (I) and the cocatalyst system of the present invention a higher regioregularity of the catalyst can be observed compared to a single site catalyst comprising the same complex of formula (I) but only an aluminoxane cocatalyst (no boron containing cocatalyst) resulting in a higher melting temperature of the homopolymer of propylene of the invention.

Preferably the homopolymer of propylene has a melting temperature of at least 150.0° C., preferably of at least 150.5° C., still more preferably of at least 151.0° C. and most preferably of at least 151.5° C. Usually, the melting temperature of the homopolymer of propylene does not exceed 160.0° C.

It is preferred in said embodiment that the polymer of propylene is said homopolymer of propylene as defined above or below.

In another embodiment the polymer of propylene can comprise a random copolymer of propylene and ethylene.

When polymerizing a random copolymer of propylene and ethylene with the single-site catalyst comprising the complex of formula (I) and the cocatalyst system of the present invention a higher ethylene comonomer response of the catalyst can be observed compared to a single site catalyst comprising the same complex of formula (I) but only an aluminoxane cocatalyst (no boron containing cocatalyst) resulting in a higher ethylene comonomer content of the random copolymer of propylene and ethylene of the invention.

The higher regioregularity of the catalyst single-site catalyst comprising the complex of formula (I) and the cocatalyst system can also be observed for the random copolymer of propylene and ethylene resulting in a comparable melting temperature Tm at a higher comonomer content of the random copolymer of propylene and ethylene of the invention. Further, when polymerizing a random copolymer of propylene and ethylene with the single-site catalyst comprising the complex of formula (I) and the cocatalyst system of the present invention a higher hydrogen response of the catalyst can be observed compared to a single site catalyst comprising the same complex of formula (I) but only an aluminoxane cocatalyst (no boron containing cocatalyst) resulting in a lower weight average molecular weight of the random copolymer of propylene and ethylene of the invention.

Preferably the random copolymer of propylene and ethylene has an ethylene comonomer content of from 0.1 to 5.0 wt %, more preferably of from 0.2 to 4.0 wt %, still more preferably of from 0.3 to 3.0 wt % and most preferably of from 0.5 to 2.5 wt %, based on the total weight of the random copolymer of propylene and ethylene.

It is preferred in said embodiment that the polymer of propylene is said random copolymer of propylene and ethylene as defined above or below.

In still another embodiment the polymer of propylene comprises a propylene homopolymer component and a random copolymer of propylene and ethylene component as defined above or below.

In said embodiment the polymer of propylene can consist of said propylene homopolymer component and said random copolymer of propylene and ethylene component.

However, in said embodiment the polymer of propylene can also comprise further propylene polymer components such as e.g. an elastomeric propylene copolymer.

For the embodiments of the polymer of propylene as discussed above the following properties can be found:

The polymer of propylene preferably has a melt flow rate $MFR_2$ of from 0.05 to 500 g/10 min, more preferably in the range of 0.20 to 200.0 g/10 min more preferably in the range of 0.50 to 150.0 g/10 min.

Further, the polymer of propylene preferably has a weight average molecular weight Mw of at least 100 kg/mol, preferably at least 200 kg/mol and more preferably of at least 230 kg/mol up to 2 000 kg/mol, preferably up to 1 500 kg/mol and more preferably up to 1000 kg/mol, like up to 500 kg/mol depending on the use and amount of hydrogen used as Mw regulating agent.

Still further, the molecular weight distribution (MWD; $M_w/M_n$ measured with GPC) of the polymer of propylene can be relatively broad, i.e. the $M_w/M_n$ can be up to 7.0. Preferably the $M_w/M_n$ is in a range of from 2.5 to 7.0, more preferably from 2.8 to 6.8 and even more preferably from 2.9 to 6.5.

In an additional embodiment, the polymer of propylene can be a heterophasic propylene copolymer.

Such heterophasic propylene copolymers (HECOs) comprise a matrix (M) being a propylene homopolymer (HECOs) in which an elastomeric copolymer, like an elastomeric propylene copolymer (E), is dispersed (rubber phase).

In another embodiment, the matrix (M) can be a propylene random copolymer having up to 5 wt % of a comonomer selected from ethylene and $C_4$ to $C_8$-alpha olefin, preferably selected from ethylene, butene or hexene, more preferably being ethylene. In this case the heterophasic propylene copolymer is named RAHECO.

Preferably, the heterophasic propylene copolymers being prepared according to this invention comprise a propylene homopolymer matrix.

Thus the polypropylene matrix (M) contains (finely) dispersed inclusions being not part of the matrix and said inclusions contain the elastomeric copolymer (E). The term "inclusion" according indicates that the matrix and the inclusion form different phases within the heterophasic system, said inclusions are for instance visible by high resolution microscopy, like electron microscopy or atomic force microscopy, or can be identified by dynamic mechanical thermal analysis (DMTA).

Specifically in DMTA the presence of a multiphase structure can be identified by the presence of at least two distinct glass transition temperatures.

Thus the heterophasic polypropylene copolymer, which is produced with the process according to the invention, comprises at least (a1) a matrix (M) comprising the homopolymer of propylene and/or the random copolymer of propylene and ethylene as defined above or below and (a2) and elastomeric copolymer (E) dispersed in said matrix (M).

The term "heterophasic polypropylene copolymer" used herein denotes copolymers consisting of a matrix resin, being a propylene homopolymer or propylene random copolymer and an elastomeric, i.e. predominantly amorphous copolymer (E) dispersed in said matrix resin, as defined in more detail below.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene homopolymer or propylene random copolymer is present in such an amount that it forms a continuous phase which can act as a matrix.

Furthermore the terms "elastomeric copolymer", "dispersed phase", "predominantly amorphous copolymer" and "rubber phase" denote the same, i.e. are interchangeable in the present invention.

Ad component (a1 (i.e. the matrix)):

Component (a1) of the particular heterophasic polypropylene copolymer is a propylene homopolymer or propylene random copolymer, preferably a propylene homopolymer.

In case that the matrix (M) is a propylene random copolymer, the propylene random copolymer can have up to 5 wt % of a comonomer selected from ethylene and $C_4$ to $C_8$-alpha olefin, preferably selected from ethylene, butene or hexene, more preferably being ethylene.

Propylene homopolymers made by the catalyst system of the invention can be made with Mw (weight average molecular weight) values from at least 100 kg/mol, preferably at least 200 kg/mol and more preferably of at least 230 kg/mol up to 2 000 kg/mol, preferably up to 1 500 kg/mol and more preferably up to 1000 kg/mol, like up to 500 kg/mol depending on the use and amount of hydrogen used as Mw regulating agent.

The catalyst systems of the invention enable the formation of propylene homopolymers with high melting points. In an embodiment the propylene homopolymer formed by the process of the invention has a melting temperature of at least 150.0° C., preferably of at least 150.5° C., still more preferably of at least 151.0° C. and most preferably of at least 151.5° C. Usually, the melting temperature of the homopolymer of propylene does not exceed 160.0° C.

The propylene homopolymer matrix has a melt flow rate $MFR_2$ (ISO 1133; 230° C.; 2.16 kg) in the range of 0.20 to 500.0 g/10 min, preferably in the range of 0.50 to 200.0 g/10 min more preferably in the range of 1.00 to 150.0 g/10 min The $MFR_2$ of the matrix is named matrix melt flow rate ($MFR_M$).

The propylene homopolymer matrix furthermore has a xylene soluble (XS) fraction (determined according to ISO 16152 at 25° C.) of below 2.0 wt %, preferably below 1.0 wt %.

Moreover it is preferred that the propylene homopolymer matrix has an intrinsic viscosity (iV) determined according to DIN ISO 1628/1 (in decaline at 135° C.) in the range of from 0.5 to 4.0 dl/g, preferably in the range of from 1.0 to 4.0 dl/g and more preferably in the range of from 2.0 to 3.0 dug.

Furthermore the molecular weight distribution (MWD; $M_w/M_n$ as measured with GPC) of the propylene homopolymer can be relatively broad, i.e. the $M_w/M_n$ can be up to 7.0. Preferably the $M_w/M_n$ is in a range of from 2.5 to 7.0, more preferably from 2.8 to 6.8 and even more preferably from 2.9 to 6.5.

Preferably, the matrix (M) of the heterophasic propylene copolymer comprises the homopolymer of propylene and/or the random copolymer of propylene and ethylene as defined above or below.

In one embodiment the matrix (M) comprises the homopolymer of propylene as defined above or below, preferably consists of the homopolymer of propylene as defined above or below.

In another embodiment the matrix (M) comprises the random copolymer of propylene and ethylene as defined above or below, preferably consists of the random copolymer of propylene and ethylene as defined above or below.

Ad component (a2) (i. e. elastomeric propylene-ethylene copolymer (E)):

Component (a2) of the particular heterophasic polypropylene copolymer is the elastomeric propylene-ethylene copolymer (E), which is a predominantly amorphous copolymer (ii) of propylene and ethylene.

Thus, component (a2) is an elastomeric copolymer, being dispersed in said matrix (M) (i.e. dispersed phase).

As stated above, the terms "elastomeric (propylene-ethylene) copolymer", "dispersed phase" and "rubber phase" denote the same, i.e. are interchangeable in view of this invention.

Component (a2), i.e. the elastomeric propylene-ethylene copolymer (E) has an ethylene content, in polymerized form, in the range of from 10.0 to 80.0 wt %, preferably in the range from 12.0 to 60.0 wt % and more preferably in the range from 15.0 to 50.0 wt %.

It is also possible that the elastomeric propylene-ethylene copolymer (E) has optionally in addition to the ethylene comonomer a second comonomer. This optional second comonomer can be 1-butene or 1-hexene.

The amount of 1-butene can be in a range of from 0.0 up to 20.0 wt %, preferably up to 15.0 wt % and more preferably up to 10.0 wt %.

The amount of 1-hexene can be in a range of from 0.0 up to 10.0 wt %, preferably up to 7.0 wt % and more preferably up to 5.0 wt %

Preferably the elastomeric propylene-ethylene copolymer (E) has no further comonomer.

The elastomeric propylene-ethylene copolymer (E) furthermore has an intrinsic viscosity (iV) determined according to DIN ISO 1628/1 (in decaline at 135° C.) in the range of 1.5 to 4.0 dl/g, preferably in the range of 1.6 to 3.5 dl/g, more preferably in the range of 1.8 to 3.0 dl/g and even more preferably from 1.9 to 2.5 dl/g.

The elastomeric propylene-ethylene copolymer (E) has a xylene soluble (XS) fraction (determined according to ISO 16152 at 25° C.) of at least 50.0 wt % up to 100.0 wt %, preferably of at least 80.0 wt % up to 100.0 wt %, and more preferably at least 95.0 wt % up to 100.0 wt %.

The elastomeric propylene-ethylene copolymer (E) fraction of the heterophasic propylene copolymer is present in an amount of 5.0 to 50.0 wt %, preferably from 8.0 to 45.0 wt % and more preferably from 10.0 to 40.0 wt %.

Final Heterophasic Propylene Copolymer

The heterophasic propylene copolymer has a total xylene soluble (XS) fraction (determined according to ISO 16152 at 25° C.) in the range of from 5.0 to 50.0 wt %, preferably in the range of from 8.0 to 40.0 wt %.

The intrinsic viscosity (iV) determined according to DIN ISO 1628/1 (in decaline at 135° C.) of the heterophasic propylene copolymer is the range of from 2.0 to 5.0 dug, preferably in the range of from 2.2 to 4.5 dl/g and more preferably in the range of 2.5 to 4.0 dl/g.

Use

The present invention further relates to the use of a single-site catalyst comprising
(i) a complex of formula (I)

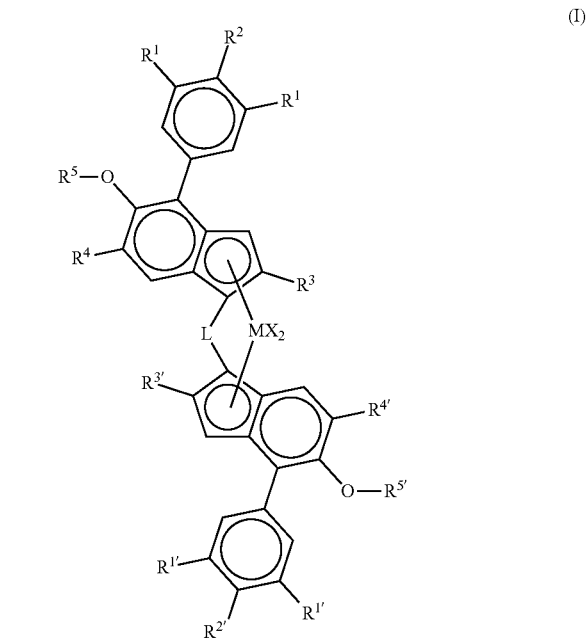

wherein

M is zirconium or hafnium;

each X independently is a sigma-donor ligand

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring;

$R^1$ and $R^{1'}$ are each independently hydrogen, $C_5$-$C_{10}$-aryl or a group —CH($R^x$)$_2$ wherein each $R^x$ is independently H or a $C_{1-10}$ hydrocarbyl group, and optionally the two $R^x$ taken together can form a ring, $R^2$ and $R^{2'}$ are each independently hydrogen, $C_5$-$C_{10}$-aryl or a group —C($R^y$)$_3$ wherein each $R^y$ is independently H or a $C_{1-10}$ hydrocarbyl group, or optionally two or three $R^y$ groups taken together can form a ring whereby at least one of $R^1$ or $R^2$ and one of $R^{1'}$ or $R^{2'}$ is different from hydrogen and whereby $R^2$ together with one of $R^1$, as well as $R^{2'}$ together with one of $R^{1'}$ can be part of a further mono- or multicyclic ring condensed to the phenyl ring $R^3$ and $R^{3'}$ are each independently a linear $C_1$ to $C_6$ hydrocarbyl group or a branched or cyclic $C_4$ to $C_{10}$ hydrocarbyl group, whereby the groups are not branched in α-position $R^4$ and $R^{4'}$ are each independently a tertiary $C_4$ to $C_{10}$ hydrocarbyl group $R^5$ and $R^{5'}$ are each independently a linear or branched $C_1$ to $C_{10}$ alkyl group or an $C_5$-$C_{10}$-aryl group and (ii) a cocatalyst system comprising a boron containing cocatalyst and an aluminoxane cocatalyst, for the production of a polymer of propylene as defined above or below.

Thereby, the polymer of propylene can be a homopolymer of propylene, a random copolymer of propylene and ethylene or mixtures thereof as defined above or below.

Further, the polymer of propylene can be a heterophasic propylene copolymer as defined above or below.

The invention will now be illustrated by reference to the following non-limiting Examples Analytical Tests Measurement Methods:

Al and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma-Optical Emmision Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% $HNO_3$, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

In the case of analysing the elemental composition of prepolymerized catalysts, the polymeric portion is digested by ashing in such a way that the elements can be freely dissolved by the acids. The total content is calculated to correspond to the weight % for the prepolymerized catalyst.

GPC: Molecular weight averages, molecular weight distribution, and polydispersity index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99.

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument Quantification of Copolymer Microstructure by NMR Spectroscopy Quantitative 13C{1H} NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)3) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra.

Quantitative 13C{1H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer:

$$fE=(E/(P+E)$$

The comonomer fraction was quantified using the method of W-J. Wang and S. Zhu, Macromolecules 2000, 33 1157, through integration of multiple signals across the whole spectral region in the 13C{1H} spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction:

$$E[mol~\%]=100*fE$$

The weight percent comonomer incorporation was calculated from the mole fraction:

$$E[wt~\%]=100*(fE*28.06)/((fE*28.06)+((1-fE)*42.08))$$

Melt Flow Rate (MFR)

The melt flow rate (MFR) or melt index (MI) is measured according to ISO 1133. Where different loads can be used, the load is normally indicated as the subscript, for instance, $MFR_2$ which indicates 2.16 kg load. The temperature is selected according to ISO 1133 for the specific polymer, for instance, 230° C. for polypropylene. Thus, for polypropylene $MFR_2$ is measured at 230° C. temperature and under 2.16 kg load and MFR21 is measured at 230° C. temperature and under 21.6 kg load.

Melting temperature ($T_m$)

The melting temperature Tm is measured with Mettler TA820 differential scanning calorimetry (DSC) on 5 to 10 mg samples. DSC is run according to ISO 3146/part 3/method C2 in a heat/cool/heat cycle with a scan rate of 10° C./min (heating and cooling) in the temperature range of +23 to +210° C. The melting temperature is determined from the second heating step. The melting temperatures were taken as the peaks of endotherms.

Xylene Solubles (XS)

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

XS %=(100·m·Vo)/(mo·v); mo=initial polymer amount (g); m=weight of residue (g); Vo=initial volume (ml); v=volume of analysed sample (ml).

Intrinsic Viscosity (IV)

The intrinsic viscosity (IV) value increases with the molecular weight of a polymer. The IV values were measured according to ISO 1628/1 in decaline at 135° C.

Catalyst Activity

The catalyst activity was calculated on the basis of following formula:

$$\text{Catalyst Activity } (kg-PP/g-Cat/h) = \frac{\text{amount of polymer produced (kg)}}{\text{catalyst loading (g)} \times \text{polymerization time (h)}}$$

Productivity

Overall productivity was calculated as $$\text{Catalyst Productivity } (kg-PP/g) = \frac{\text{amount of polymer produced (kg)}}{\text{catalyst loading (g)}}$$

For both the catalyst activity and the productivity the catalyst loading is the grams of non-prepolymerised (unprepped) catalyst.

Metallocene Activity

Metallocene activity (MC activity) was calculated on the basis of following formula:

$$\text{MC Activity } (kg-PP/g-MC/h) = \frac{\text{amount of polymer produced (kg)}}{\text{catalyst loading (g)} \times \text{polymerization time (h)}}$$

wherein the catalyst loading refers to the grams of metallocene (MC) present in the catalyst.

Prepolymerization Degree (DP): Weight of Polymer/Weight of Solid Catalyst Before Prepolymerization Step The composition of the catalysts (before the off-line prepolymerization step) has been determined by ICP as described above. The metallocene content of the prepolymerized catalysts has been calculated from the ICP data as follows:

$$\frac{Al}{Zr}(mol/mol) = \frac{Al(wt~\%,~ICP)/26,98}{Zr(wt~\%,~ICP)/91,22} \quad \text{Equation 1}$$

$$Zr(mol~\%) = \frac{100}{\frac{Al}{Zr}(mol/mol) + 1} \quad \text{Equation 2}$$

$$MC(wt~\%,~\text{unprepol. cat}) = \quad \text{Equation 3}$$

$$\frac{100 \times (Zr,~mol~\% \times MwMC)}{Zr,~mol~\% \times MwMC + (100 - Zr,~mol~\%) \times MwMAO}$$

$$MC(wt~\%,~\text{prepolymerized cat}) = \quad \text{Equation 4}$$

$$\frac{MC(wt~\%,~\text{unprepolymerized cat})}{DP + 1}$$

Examples

Metallocene Synthesis

Materials Used for Complex Preparation:

2,6-Dimethylaniline (Acros), 1-bromo-3,5-dimethylbenzene (Acros), 1-bromo-3,5-di-tert-butylbenzene (Acros), bis (2,6-diisopropylphenyl)imidazolium chloride (Aldrich), triphenylphosphine (Acros), $NiCl_2(DME)$ (Aldrich), dichlorodimethylsilane (Merck), $ZrCl_4$ (Merck), trimethylborate (Acros), $Pd(OAc)_2$ (Aldrich), $NaBH_4$ (Acros), 2.5 M nBuLi in hexanes (Chemetal), CuCN (Merck), magnesium turnings (Acros), silica gel 60, 40-63 μm (Merck), bromine (Merck), 96% sulfuric acid (Reachim), sodium nitrite (Merck), copper powder (Alfa), potassium hydroxide (Merck), K$_2$CO$_3$ (Merck), 12 M HCl (Reachim), TsOH (Aldrich), MgSO$_4$ (Merck), Na$_2$CO$_3$ (Merck), Na$_2$SO$_4$ (Akzo Nobel), methanol (Merck), diethyl ether (Merck), 1,2-dimethoxyethane (DME, Aldrich), 95% ethanol (Merck), dichloromethane (Merck), hexane (Merck), THF (Merck), and toluene (Merck) were used as received. Hexane, toluene and dichloromethane for organometallic synthesis were dried over molecular sieves 4A (Merck). Diethyl ether, THF, and 1,2-dimethoxyethane (Aldrich) for organometallic synthesis were distilled over sodium benzophenoneketyl. CDCl$_3$ (Deutero GmbH) and CD$_2$Cl$_2$ (Deutero GmbH) were dried over molecular sieves 4A. 4-Bromo-6-tert-butyl-5-methoxy-2-methylindan-1-one was obtained as described in WO 2013/007650.

The following complexes as shown below were used in preparing catalysts for the examples:

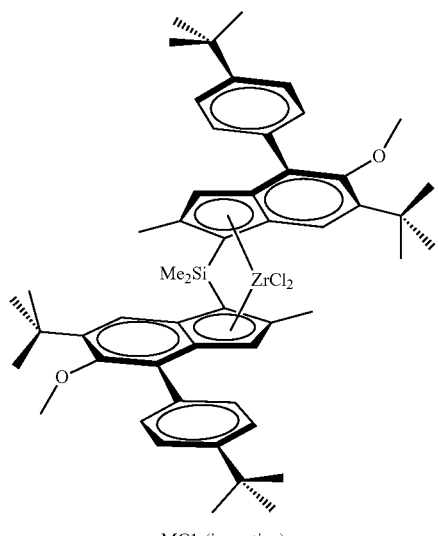

MC1 (inventive)

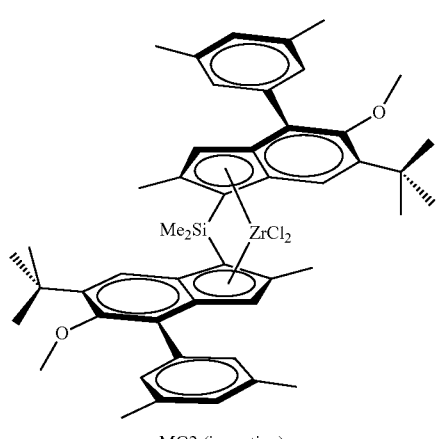

MC2 (inventive)

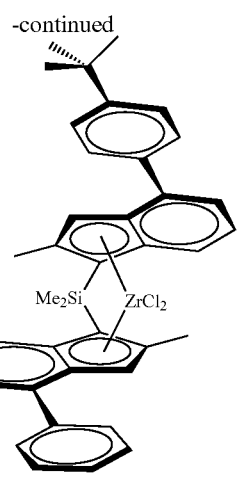

MC3 (comparative)

Synthesis of Metallocene MC1

4-(4-tert-Butylphenyl)-1-methoxy-2-methyl-1,2,3,5,6,7-hexahydro-s-indacene

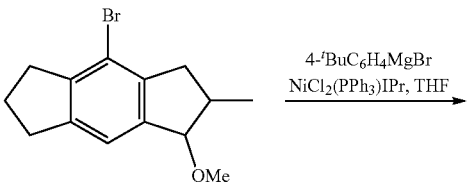

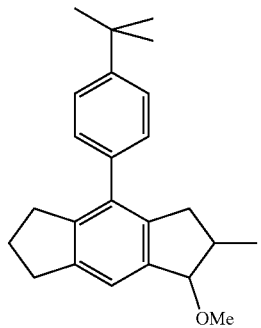

The precursor 4-bromo-1-methoxy-2-methyl-1,2,3,5,6,7-hexahydro-s-indacene was made according to the procedure described in WO2015/158790 A2 (pp 26-29).

To a mixture of 1.5 g (1.92 mmol, 0.6 mol. %) of NiCl$_2$(PPh$_3$)IPr and 89.5 g (318.3 mmol) of 4-bromo-1-methoxy-2-methyl-1,2,3,5,6,7-hexahydro-s-indacene, 500 ml (500 mmol, 1.57 equiv) of 1.0 M 4-tert-butylphenylmagnesium bromide in THF was added. The resulting solution was refluxed for 3 h, then cooled to room temperature, and 1000 ml of 0.5 M HCl was added. Further on, this mixture was extracted with 1000 ml of dichloromethane, the organic layer was separated, and the aqueous layer was extracted with 250 ml of dichloromethane. The combined organic extract was evaporated to dryness to give a greenish oil. The title product was isolated by flash-chromatography on silica gel 60 (40-63 μm; eluent: hexanes-dichloromethane=3:1, vol., then 1:3, vol.). This procedure gave 107 g (ca. 100%) of 1-methoxy-2-methyl-4-(4-tert-butylphenyl)-1,2,3,5,6,7-hexahydro-s-indacene as a white solid mass.

Anal. calc. for C$_{24}$H$_{30}$O: C, 86.18; H, 9.04. Found: C, 85.99; H, 9.18.

$^1$H NMR (CDCl$_3$), syn-isomer: δ 7.42-7.37 (m, 2H), 7.25-7.20 (m, 3H), 4.48 (d, J=5.5 Hz, 1H), 3.44 (s, 3H), 2.99-2.47 (m, 7H), 2.09-1.94 (m, 2H), 1.35 (s, 9H), 1.07 (d, J=6.9 Hz, 3H); Anti-isomer: δ 7.42-7.37 (m, 2H), 7.25-7.19 (m, 3H), 4.39 (d, J=3.9 Hz, 1H), 3.49 (s, 3H), 3.09 (dd, J=15.9 Hz, J=7.5 Hz, 1H), 2.94 (t, J=7.3 Hz, 2H), 2.78 (tm, J=7.3 Hz, 2H), 2.51-2.39 (m, 1H), 2.29 (dd, J=15.9 Hz, J=5.0 Hz, 1H), 2.01 (quin, J=7.3 Hz, 2H), 1.36 (s, 9H), 1.11 (d, J=7.1 Hz, 3H). $^{13}$C{$^1$H} NMR (CDCl$_3$), syn-isomer: δ 149.31, 142.71, 142.58, 141.46, 140.03, 136.71, 135.07, 128.55, 124.77, 120.02, 86.23, 56.74, 39.41, 37.65, 34.49, 33.06, 32.45, 31.38, 25.95, 13.68; Anti-isomer: δ 149.34, 143.21, 142.90, 140.86, 139.31, 136.69, 135.11, 128.49, 124.82, 119.98, 91.53, 56.50, 40.12, 37.76, 34.50, 33.04, 32.40, 31.38, 25.97, 19.35.

4-(4-tert-Butylphenyl)-6-methyl-1,2,3,5-tetrahydro-s-indacene

To a solution of 107 g 1-methoxy-2-methyl-4-(4-tert-butylphenyl)-1,2,3,5,6,7-hexahydro-s-indacene (prepared above) in 700 ml of toluene, 600 mg of TsOH was added, and the resulting solution was refluxed using Dean-Stark head for 10 min. After cooling to room temperature the reaction mixture was washed with 200 ml of 10% NaHCO$_3$. The organic layer was separated, and the aqueous layer was additionally extracted with 2×100 ml of dichloromethane. The combined organic extract was evaporated to dryness to give a red oil. The product was purified by flash-chromatography on silica gel 60 (40-63 μm; eluent: hexanes, then hexanes-dichloromethane=5:1, vol.) followed by vacuum distillation, b.p. 210-216° C./5-6 mm Hg. This procedure gave 77.1 g (80%) of 4-(4-tert-butylphenyl)-6-methyl-1,2,3,5-tetrahydro-s-indacene as a yellowish glassy material.

Anal. calc. for C$_{23}$H$_{26}$: C, 91.34; H, 8.66. Found: C, 91.47; H, 8.50.

$^1$H NMR (CDCl$_3$): δ 7.44-7.37 (m, 2H), 7.33-7.26 (m, 2H), 7.10 (s, 1H), 6.45 (br.s, 1H), 3.17 (s, 2H), 2.95 (t, J=7.3 Hz, 2H), 2.78 (t, J=7.3 Hz, 2H), 2.07 (s, 3H), 2.02 (quin, J=7.3 Hz, 2H), 1.37 (s, 9H). $^{13}$C{$^1$H} NMR (CDCl$_3$): δ 149.37, 145.54, 144.79, 142.91, 139.92, 138.05, 137.15, 134.06, 128.36, 127.02, 124.96, 114.84, 42.11, 34.53, 33.25, 32.16, 31.41, 25.96, 16.77.

Bis[2-methyl-4-(4-tert-butylphenyl)-5-methoxy-6-tert-butyl-1H-inden-1-yl]dimethylsilane

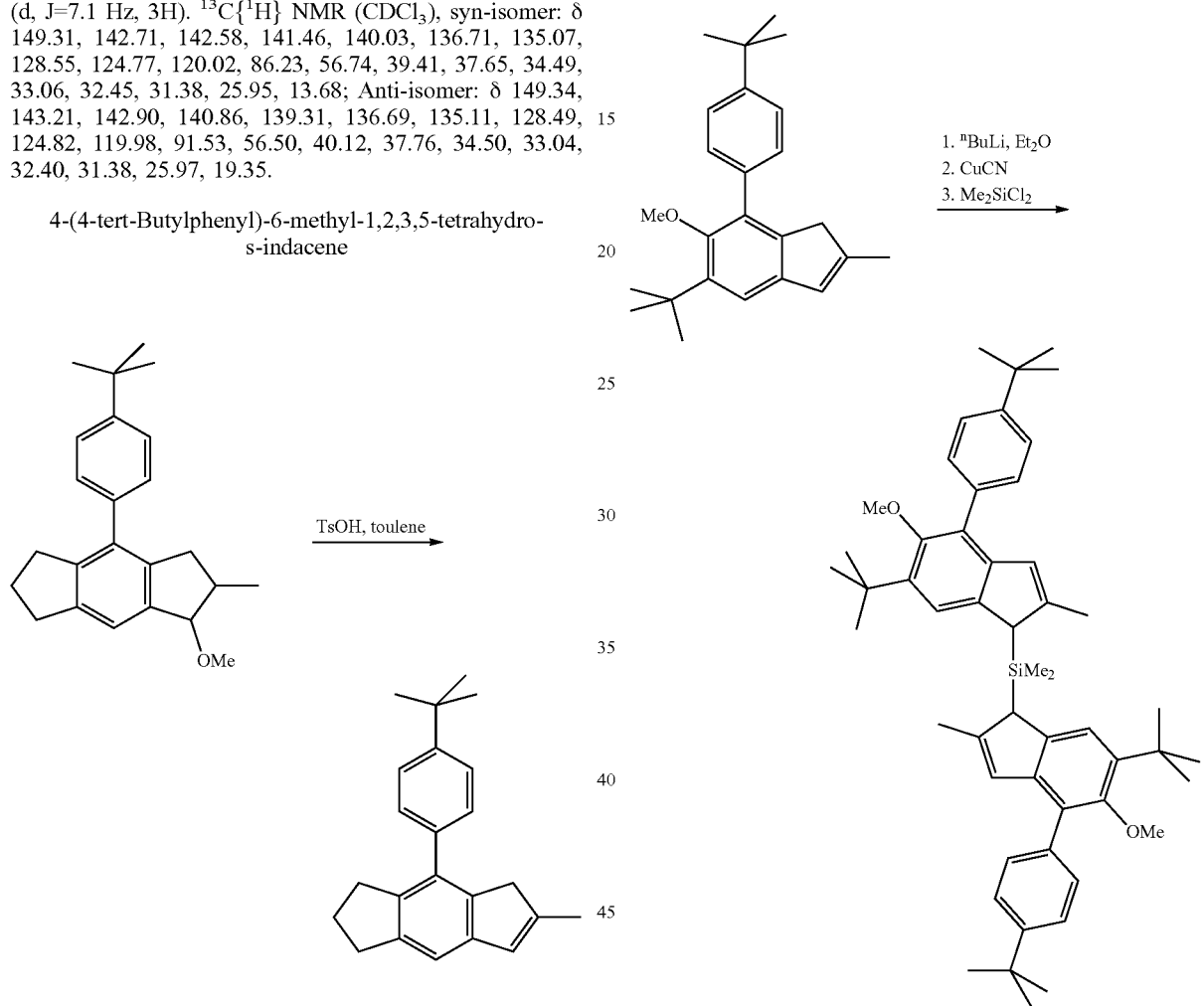

20.6 ml (50.06 mmol) of 2.43 M nBuLi in hexanes was added in one portion to a solution of 17.43 g (50.01 mmol) of 2-methyl-5-tert-butyl-7-(4-tert-butylphenyl)-6-methoxy-1H-indene in 300 ml of ether at −50° C. This mixture was stirred overnight at room temperature, then the resulting yellow solution with a lot of yellow precipitate was cooled to −60° C., and 225 mg of CuCN was added. The obtained mixture was stirred for 30 min at −25° C., and then 3.23 g (25.03 mmol) of dichlorodimethylsilane was added in one portion. Further on, this mixture was stirred overnight at ambient temperature. This solution was filtered through a pad of silica gel 60 (40-63 μm) which was additionally washed with 2×50 ml of dichloromethane.

The combined filtrate was evaporated under reduced pressure, and the residue was dried in vacuum at elevated temperature. This procedure gave 18.76 g (ca. 100%, purity ca. 85%) of bis[2-methyl-4-(4-tert-butylphenyl)-5-methoxy-6-tert-butyl-1H-inden-1-yl]dimethylsilane (a ca. 7:3 mixture of diastereoisomers) as a white powder.

1H NMR (CDCl3): δ 7.50-7.39 (m, 4H), 7.32 and 7.25 (2s, sum 1H), 6.48 and 6.46 (2s, sum 1H), 3.61 and 3.58 (2s, sum 1H), 3.21 (s, 3H), 2.12 and 2.06 (2s, sum 3H), 1.43, 1.42, 1.39 and 1.38 (4s, sum 18H), −0.18 and −0.19 (2s, sum 3H). 13C{1H} NMR (CDCl3): δ 155.50, 149.45, 147.55, 147.20, 143.70, 139.37, 137.09, 135.22, 135.19, 129.74, 127.26, 126.01, 125.94, 125.04, 120.58, 120.36, 60.48, 47.42, 47.16, 35.15, 34.56, 31.47, 31.27, 31.20, 17.75, −4.92, −5.22, −5.32.

Rac-dimethylsilanediyl-bis[2-methyl-4-(4-tert-butylphenyl)-5-methoxy-6-tert-butyl-inden-1-yl] zirconium dichloride

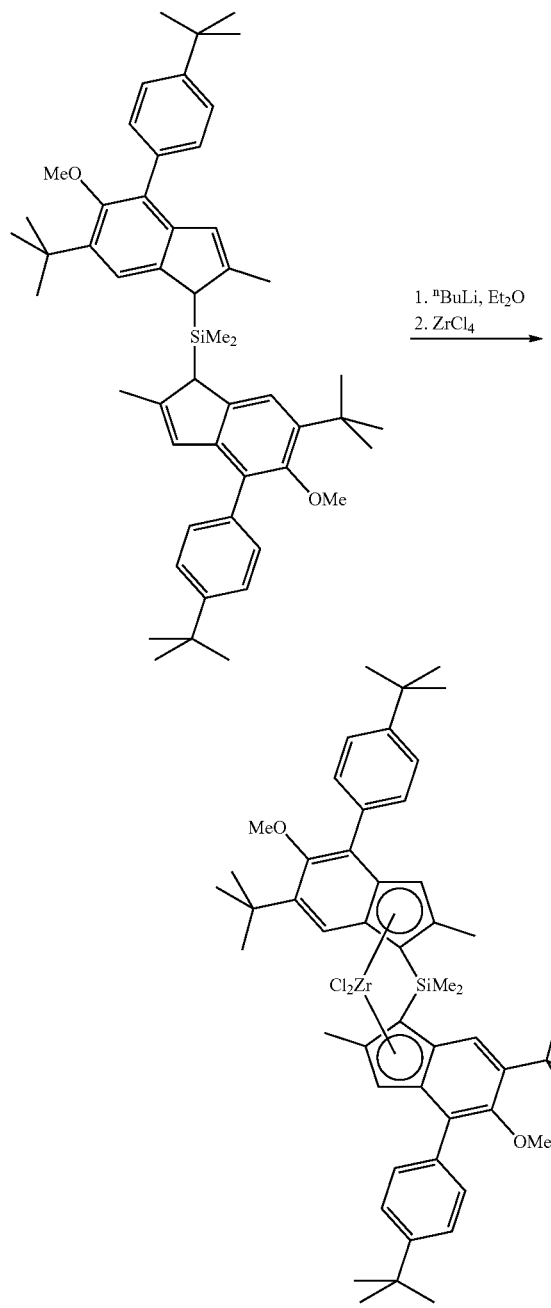

19.0 ml (46.17 mmol) of 2.43 M nBuLi in hexanes was added in one portion to a solution of 17.3 g (22.97 mmol) of bis[2-methyl-4-(4-tert-butylphenyl)-5-methoxy-6-tert-butyl-1H-inden-1-yl]dimethylsilane in 320 ml of ether cooled to −60° C. This mixture was stirred overnight at room temperature, then the resulting yellow solution with a lot of yellow precipitate was cooled to −60° C., and 5.36 g (23.0 mmol) of ZrCl4 was added. The reaction mixture was stirred for 24 h at room temperature to give orange solution with a large amount of orange precipitate. This precipitate was filtered off (G4), heated with 300 ml of methylcyclohexane, and the formed suspension was filtered while hot from LiCl through glass frit (G4). Yellow powder precipitated overnight at room temperature from the filtrate was filtered off (G3) and then dried in vacuum. This procedure gave 3.98 g of rac-complex, contaminated with ca. 3% of meso-form. This mixture was dissolved in 40 ml of hot toluene, the formed solution was evaporated in vacuum to ca. 10 ml. Yellow powder precipitated at room temperature was filtered off (G3) and then dried in vacuum to give 3.41 g (16%) of pure rac-dimethylsilanediyl-bis[2-methyl-4-(4-tert-butylphenyl)-5-methoxy-6-tert-butyl-inden-1-yl]zirconium dichloride (content of meso-form <1%). The ether mother liquor was evaporated to dryness, and the residue was dissolved in 100 ml of warm toluene. This solution was filtered through glass frit (G4), and the obtained filtrate was evaporated to ca. 40 ml. Yellow powder precipitated from this solution at room temperature was immediately filtered off and dried in vacuum to give 2.6 g of a ca. 5 to 1 mixture of rac- and meso-zirconocenes (in favor to rac-). All mother liquors were combined, evaporated to a volume ca. 20 ml, and the residue was triturated with 100 ml of n-hexane. The formed orange powder was collected and dried in vacuum. This procedure gave 5.8 g of a mixture of rac- and meso-zirconocenes. Thus, the total yield of rac- and meso-zirconocenes isolated in this synthesis was 11.81 g (56%). Rac-dimethylsilanediyl-bis[2-methyl-4-(4-tert-butylphenyl)-5-methoxy-6-tert-butyl-inden-1-yl]zirconium dichloride.

Anal. calc. for C52H66Cl2O2SiZr: C, 68.39; H, 7.28. Found: C, 68.70; H, 7.43. 1H NMR (CDCl3): δ 7.63-7.52 (m, 2H), 7.50 (s, 1H), 7.44 (d, J=8.1 Hz, 2H), 6.63 (s, 1H), 3.39 (s, 3H), 2.16 (s, 3H), 1.38 (s, 9H), 1.33 (s, 9H), 1.29 (s, 3H). 13C{1H} NMR (CDCl3): δ 160.00, 150.16, 144.25, 135.07, 133.79, 133.70, 129.25, 127.08, 125.39, 123.09, 121.32, 120.81, 81.57, 62.61, 35.78, 34.61, 31.39, 30.33, 18.37, 2.41

Synthesis of metallocene MC2

4-Bromo-2,6-dimethylaniline

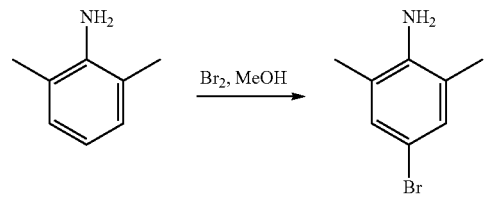

159.8 g (1.0 mol) of bromine was slowly (over 2 h) added to a stirred solution of 121.2 g (1.0 mol) of 2,6-dimethylaniline in 500 ml of methanol. The resulting dark-red solution was stirred overnight at room temperature, then poured into a cold solution of 140 g (2.5 mol) of potassium hydroxide in 1100 ml of water. The organic layer was separated, and the aqueous one was extracted with 500 ml of diethyl ether. The combined organic extract was washed with 1000 ml of water, dried over K$_2$CO$_3$, and evaporated in vacuum to give 202.1 g of 4-bromo-2,6-dimethylaniline (purity ca. 90%) as dark-red oil which crystallized upon standing at room temperature. This material was further used without additional purification.

$^1$H NMR (CDCl$_3$): δ 7.04 (s, 2H), 3.53 (br.s, 2H), 2.13 (s, 6H).

1-Bromo-3,5-dimethylbenzene

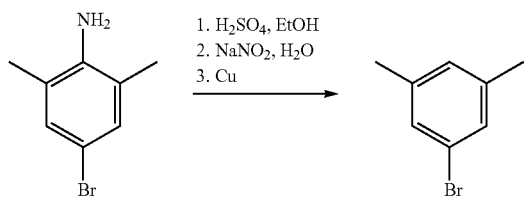

97 ml (1.82 mol) of 96% sulfuric acid was added dropwise to a solution of 134.7 g (ca. 673 mmol) of 4-bromo-2,6-dimethylaniline (prepared above, purity ca. 90%) in 1400 ml of 95% ethanol cooled to −10° C., at a such a rate to maintain the reaction temperature below 7° C. After the addition was complete, the solution was stirred at room temperature for 1 h. Then, the reaction mixture was cooled in an ice-bath, and a solution of 72.5 g (1.05 mol) of sodium nitrite in 150 ml of water was added dropwise over ca. 1 h. The formed solution was stirred at the same temperature for 30 min. Then the cooling bath was removed, and 18 g of copper powder was added. Upon completion of the rapid evolution of nitrogen additional portions (ca. 5 g each, ca. 50 g in total) of copper powder were added with 10 min intervals until gas evolution ceased completely. The reaction mixture was stirred at room temperature overnight, then filtered through a glass frit (G3), diluted with two-fold volume of water, and the crude product was extracted with 4×150 ml of dichloromethane. The combined extract was dried over K$_2$CO$_3$, evaporated to dryness, and then distilled in vacuum (b.p. 60-63° C./5 mm Hg) to give a yellowish liquid. This product was additionally purified by flash-chromatography on silica gel 60 (40-63 μm; eluent: hexane) and distilled once again (b.p. 51-52° C./3 mm Hg) to give 63.5 g (51%) of 1-bromo-3,5-dimethylbenzene as a colorless liquid.

$^1$H NMR (CDCl$_3$): δ 7.12 (s, 2H), 6.89 (s, 1H), 2.27 (s, 6H). $^{13}$C{$^1$H} NMR (CDCl$_3$): δ 139.81, 129.03, 128.61, 122.04, 20.99.

(3,5-Dimethylphenyl)boronic Acid

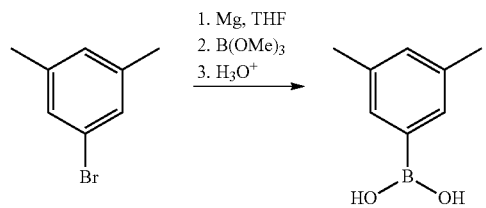

A solution of 3,5-dimethylphenylmagnesium bromide obtained from a solution of 190.3 g (1.03 mol) of 1-bromo-3,5-dimethylbenzene in 1000 ml of THF and 32 g (1.32 mol, 28% excess) of magnesium turnings was cooled to −78° C., and 104 g (1.0 mol) of trimethylborate was added in one portion. The resulting heterogeneous mixture was stirred overnight at room temperature. The boronic ester was hydrolyzed by careful addition of 1200 ml of 2 M HCl. 500 ml of diethyl ether was added, the organic layer was separated, and the aqueous layer was additionally extracted with 2×500 ml of diethyl ether. The combined organic extract was dried over Na$_2$SO$_4$ and then evaporated to dryness to give white mass. The latter was triturated with 200 ml of n-hexane, filtered through glass frit (G3), and the precipitate was dried in vacuo. This procedure gave 114.6 g (74%) of (3,5-dimethylphenyl)boronic acid. Anal. calc. for C$_8$H$_{11}$BO$_2$: C, 64.06; H, 7.39. Found: C, 64.38; H, 7.72.

$^1$H NMR (DMSO-d6): δ 7.38 (s, 2H), 7.00 (s, 1H), 3.44 (very br.s, 2H), 2.24 (s, 6H).

6-tert-Butyl-4-(3,5-dimethylphenyl)-5-methoxy-2-methylindan-1-one

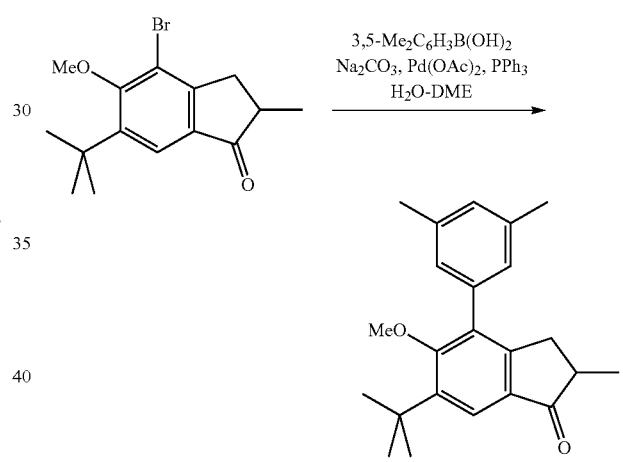

A mixture of 49.14 g (157.9 mmol) of 4-bromo-6-tert-butyl-5-methoxy-2-methylindan-1-one, 29.6 g (197.4 mmol, 1.25 eq.) of (3,5-dimethylphenyl)boronic acid, 45.2 g (427 mmol) of Na$_2$CO$_3$, 1.87 g (8.3 mmol, 5 mol. %) of Pd(OAc)$_2$, 4.36 g (16.6 mmol, 10 mol. %) of PPh$_3$, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over K$_2$CO$_3$ and then evaporated to dryness to give a black oil. The crude product was purified by flash chromatography on silica gel 60 (40-63 μm, hexane-dichloromethane=1:1, vol., then, 1:3, vol.) to give 48.43 g (91%) of 6-tert-butyl-4-(3,5-dimethylphenyl)-5-methoxy-2-methylindan-1-one as a brownish oil.

Anal. calc. for C$_{23}$H$_{28}$O$_2$: C, 82.10; H, 8.39. Found: C, 82.39; H, 8.52.

$^1$H NMR (CDCl$_3$): δ 7.73 (s, 1H), 7.02 (s, 1H), 7.01 (s, 2H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz, 1H), 2.36 (s, 6H), 1.42 (s, 9H), 1.25 (d, J=7.5 Hz, 3H). $^{13}$C{$^1$H} NMR (CDCl$_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

5-tert-Butyl-7-(3,5-dimethylphenyl)-6-methoxy-2-methyl-1H-indene

Bis[6-tert-butyl-4-(3,5-dimethylphenyl)-5-methoxy-2-methyl-1H-inden-1-yl]dimethylsilane

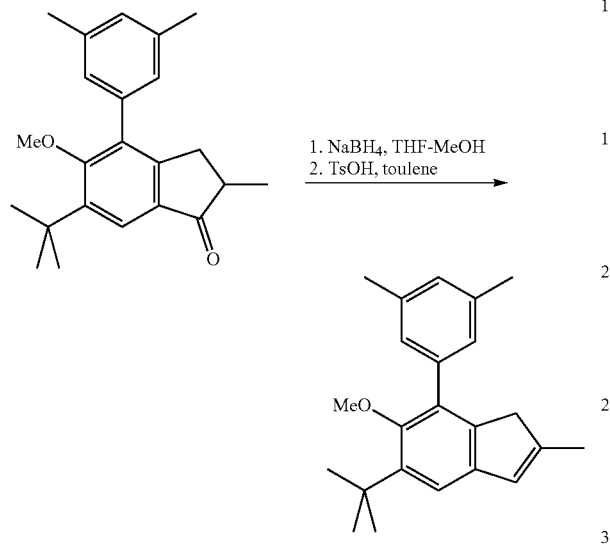

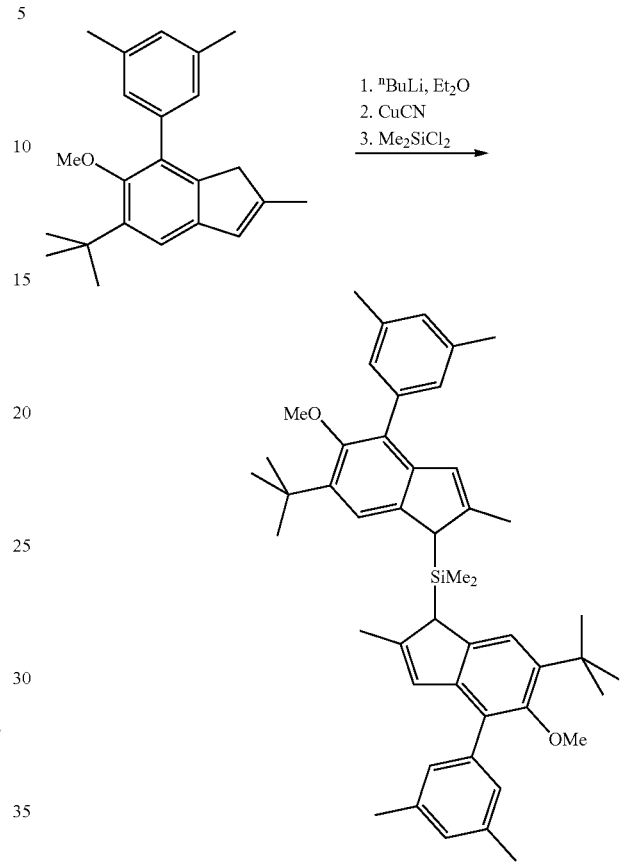

8.2 g (217 mmol) of NaBH$_4$ was added to a solution of 48.43 g (143.9 mmol) of 6-tert-butyl-4-(3,5-dimethylphenyl)-5-methoxy-2-methylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% Na$_2$CO$_3$, the organic layer was separated, the aqueous layer was extracted with 150 ml of dichloromethane. The combined organic extract was dried over K$_2$CO$_3$ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 5-tert-butyl-7-(3,5-dimethylphenyl)-6-methoxy-2-methyl-1H-indene which was further used without additional purification.

Anal. calc. for C$_{23}$H$_{28}$O: C, 86.20; H, 8.81. Found: C, 86.29; H, 9.07.

$^1$H NMR (CDCl$_3$): δ 7.20 (s, 1H), 7.08 (br.s, 2H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}$C{$^1$H} NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

28.0 ml (70 mmol) of 2.5 M $^n$BuLi in hexanes was added in one portion to a solution of 22.36 g (69.77 mmol) of 5-tert-butyl-7-(3,5-dimethylphenyl)-6-methoxy-2-methyl-1H-indene in 350 ml of ether at −50° C. This mixture was stirred overnight at room temperature, then the resulting orange solution with a large amount of yellow precipitate was cooled to −60° C. (at this temperature the precipitate almost completely disappeared), and 400 mg of CuCN was added. The resulting mixture was stirred for 30 min at −25° C., and then 4.51 g (34.95 mmol) of dichlorodimethylsilane was added in one portion. This mixture was stirred overnight at room temperature, then filtered through a pad of silica gel 60 (40-63 μm) which was additionally washed by 2×50 ml of dichloromethane. The combined filtrate was evaporated under reduced pressure, and the residue was dried in vacuum at elevated temperature. This procedure gave 24.1 g (99%) of bis[6-tert-butyl-4-(3,5-dimethylphenyl)-5-methoxy-2-methyl-1H-inden-1-yl]dimethylsilane (>90% purity by NMR, approx. 3:1 mixture of stereoisomers) as a yellowish glass which was further used without additional purification.

$^1$H NMR (CDCl$_3$): δ 7.49, 7.32, 7.23, 7.11, 6.99 (5s, sum 8H), 6.44 and 6.43 (2s, sum 2H), 3.67, 3.55 (2s, sum 2H), 3.27, 3.26 (2s, sum 6H), 2.38 (s, 12H), 2.13 (s, 6H), 1.43 (s, 18H), −0.13, −0.18, −0.24 (3s, sum 6H). $^{13}$C{$^1$H} NMR (CDCl$_3$): δ 155.29, 147.57, 147.23, 143.63, 139.37, 139.26, 138.19, 137.51, 137.03, 128.24, 127.90, 127.47, 126.01, 125.89, 120.53, 120.34, 60.51, 47.35, 47.16, 35.14, 31.28, 31.20, 21.44, 17.94, 17.79, −4.84, −4.89, −5.84.

Rac-dimethylsilanediyl-bis[2-methyl-4-(3,5-dimethylphenyl)-5-methoxy-6-tert-butyl-inden-1-yl]zirconium dichloride (MC2)

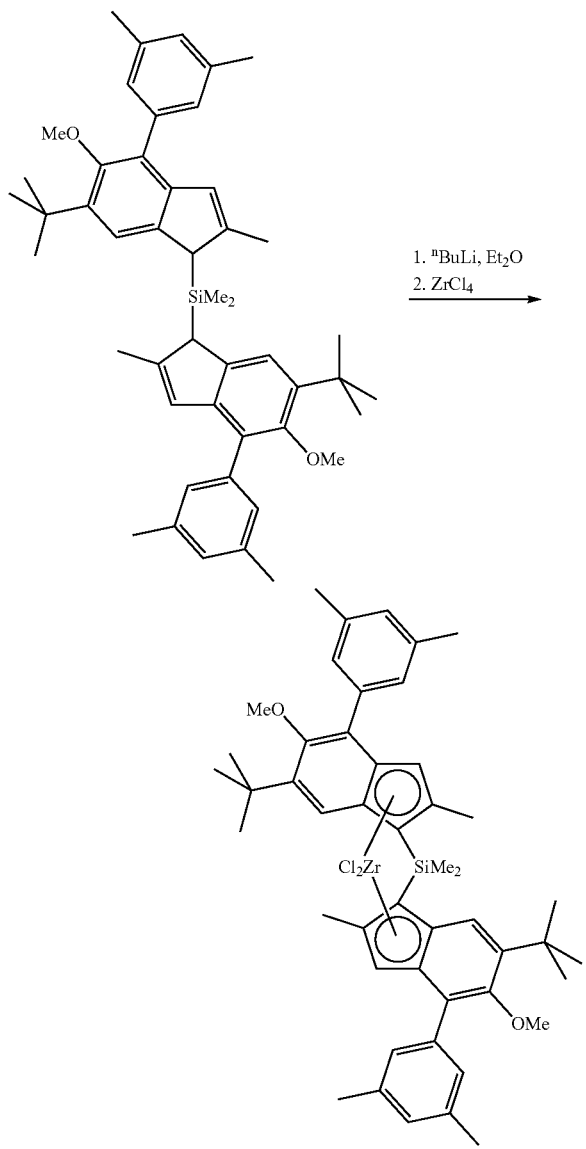

27.7 ml (69.3 mmol) of 2.5 M $^n$BuLi in hexanes was added in one portion to a solution of 24.1 g (34.53 mmol) of bis[6-tert-butyl-4-(3,5-dimethylphenyl)-5-methoxy-2-methyl-1H-inden-1-yl]dimethylsilane (prepared above) in 350 ml of diethyl ether cooled to −50° C. This mixture was stirred overnight at room temperature, then the resulting yellow solution with a large amount of yellow precipitate was cooled to −50° C., and 8.05 g (34.54 mmol) of ZrCl$_4$ was added. The reaction mixture was stirred for 24 h at room temperature to give a reddish-orange solution containing some precipitate. This mixture was evaporated to dryness. The residue was heated with 200 ml of toluene, and the formed suspension was filtered while hot through a glass frit (G4). The filtrate was evaporated to 70 ml, and then 50 ml of hexane was added. Crystals precipitated from this solution overnight at room temperature were collected, washed with 25 ml of hexane, and dried in vacuo. This procedure gave 4.01 g of pure rac-zirconocene. The mother liquor was evaporated to ca. 50 ml, and 50 ml of hexane was added. Orange crystals precipitated from this solution overnight at room temperature were collected and then dried in vacuum. This procedure gave 2.98 g of rac-zirconocene. Again, the mother liquor was evaporated almost to dryness, and 50 ml of hexane was added. Orange crystals precipitated from this solution overnight at −30° C. were collected and dried in vacuum. This procedure gave 3.14 g of rac-zirconocene. Thus, the total yield of rac-zirconocene isolated in this synthesis was 10.13 g (34%).

Rac-MC2.

Anal. calc. for $C_{48}H_{58}Cl_2O_2SiZr$: C, 67.26; H, 6.82. Found: C, 67.42; H, 6.99.

$^1$H NMR (CDCl$_3$): δ 7.49 (s, 1H), 7.23 (very br.s, 2H), 6.96 (s, 1H), 6.57 (s, 1H), 3.44 (s, 3H), 2.35 (s, 6H), 2.15 (s, 3H), 1.38 (s, 9H), 1.27 (s, 3H). $^{13}$C{$^1$H} NMR (CDCl$_3$): δ 159.78, 144.04, 137.87, 136.85, 134.89, 133.86, 128.85, 127.39, 127.05, 122.91, 121.18, 120.80, 81.85, 62.66, 35.76, 30.38, 21.48, 18.35, 2.41.

Synthesis of Metallocene MC3 (Comparative)

The metallocene MC3 (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650.

Catalyst Preparation Examples

MAO was purchased from Chemtura and used as a 30 wt-% solution in toluene. Trityl tetrakis(pentafluorophenyl)borate (Boulder Chemicals) was used as purchased.

As surfactants was used 1H,1H-Perfluoro(2-methyl-3-oxahexan-1-ol) (CAS 26537-88-2) purchased from Unimatec, dried over activated molecular sieves (2 times) and degassed by argon bubbling prior to use (S1).

Hexadecafluoro-1,3-dimethylcyclohexane (PFC) (CAS number 335-27-3) was obtained from commercial sources and dried over activated molecular sieves (2 times) and degassed by argon bubbling prior to use.

Propylene was provided by *Borealis* and adequately purified before use.

Triethylaluminium was purchased from Chemtura and used in pure form.

Hydrogen was provided by AGA and purified before use.

All the chemicals and chemical reactions were handled under an inert gas atmosphere using Schlenk and glovebox techniques, with oven-dried glassware, syringes, needles or cannulas.

Comparative Catalyst CC1 (Al/S1=167 mol/mol)

Inside the glovebox, 86.4 mg of dry and degassed S1 were mixed with 2 mL of 30 wt.-% Chemtura MAO in a septum bottle and left to react overnight. The following day, 69.3 mg of metallocene MC1 (0,076 mmol, 1 equivalent) were dissolved with 4 mL of the 30 wt.-% Chemtura MAO solution in another septum bottle and left under stirring inside the glovebox. After 60 minutes, 1 mL of the MAO/surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.75 g of a red free flowing powder was obtained.

Comparative Catalyst CC2 (Al/S1=167 mol/mol)

Inside the glovebox, 86.2 mg of dry and degassed Si were mixed with 2 mL of 30 wt.-% Chemtura MAO in a septum bottle and left to react overnight. The following day, 65.1 mg of metallocene MC2 (0.076 mmol, 1 equivalent) were dissolved with 4 mL of the 30 wt.-% Chemtura MAO solution in another septum bottle and left under stirring inside the glovebox. After 60 minutes, 1 mL of the MAO/surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.79 g of a red free flowing powder was obtained.

Inventive Catalyst IC1 (AUS1=250 mol/mol, B/Zr=1 mol/mol)

Inside the glovebox, Si surfactant solution (28.8 mg of dry and degassed Si dilute in 0.2 mL toluene) was added dropwise to 5 mL of 30 wt.-% Chemtura MAO. The solutions were left under stirring for 10 minutes. Then, 104.0 mg of metallocene MC1 was added to MAO/surfactant. After 60 minutes, 105.0 mg of trityl tetrakis(pentafluorophenyl)borate was added. The mixture was left to react at room temperature inside the glovebox for 60 min. Then, the surfactant-MAO-metallocene-borate solution were added into a 50 mL emulsification glass reactor containing 40 mL of PFC at −10° C. and equipped with an overhead stirrer (stirring speed=600 rpm). A yellow emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.6 g of a red free flowing powder was obtained.

Inventive Catalyst IC2 (AUS1=250 mol/mol, B/Zr=1 mol/mol)

Inside the glovebox, Si surfactant solution (29.2 mg of dry and degassed Si dilute in 0.2 mL toluene) was added dropwise to 5 mL of 30 wt.-% Chemtura MAO. The solutions were left under stirring for 10 minutes. Then, 97.7 mg of metallocene MC2 was added to MAO/surfactant. After 60 minutes, 105.0 mg of trityl tetrakis(pentafluorophenyl)borate was added. The mixture was left to react at room temperature inside the glovebox for 60 min. Then, the surfactant-MAO-metallocene-borate solution were added into a 50 mL emulsification glass reactor containing 40 mL of PFC at −10° C. and equipped with an overhead stirrer (stirring speed=600 rpm). A yellow emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.70 g of a red free flowing powder was obtained.

Comparative Catalyst CC3

Comparative catalyst CC3 has been produced as Example 1 described in WO 2014/060541 A1 using metallocene MC3. As cocatalyst system in catalyst CC3 was used MAO and trityl tetrakis(pentafluorophenyl)borate. Said borate was added into the synthesis in a ratio B/Zr of 1.84 mol/mol.

Comparative Catalyst CC4

Comparative catalyst CC4 has been produced as Comparative example 1 described in WO 2014/060541 A1 using metallocene MC3. As cocatalyst system catalyst CC4 includes MAO but no borate cocatalyst.

Off-Line Prepolymerization ("Prepping") Procedure

The catalysts IC1, IC2, CC1 and CC2 were pre-polymerized according to the following procedure: Off-line pre-polymerization experiment was done in a 125 mL pressure reactor equipped with gas-feeding lines and an overhead stirrer. Dry and degassed perfluoro-1.3-dimethylcyclohexane (15 cm$^3$) and the desired amount of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerization was reached. The reaction was stopped by flashing the volatile components. Inside glove box, the reactor was opened and the content poured into a glass vessel. The perfluoro-1,3-dimethylcyclohexane was evaporated until a constant weight was obtained to yield the pre-polymerized catalyst.

TABLE 1

Off-line prepolymerization experiments.

| Catalyst | Metallocene | Catalyst amount (mg) | Prepolymerised Catalyst | Yield (g) | DP (wt/wt) |
|---|---|---|---|---|---|
| CC1 | MC1 | 402.7 | CC1p | 1.8258 | 3.53 |
| IC1 | MC1 | 500.0 | IC1p | 3.2734 | 5.60 |
| CC2 | MC2 | 408.5 | CC2p | 1.7145 | 3.20 |
| IC2 | MC2 | 415.8 | IC2p | 2.7331 | 5.57 |

ICP Analysis

In Table 2 the amounts of Al (wt. %), Zr (wt. %), MC of the unprepolymerized catalyst (wt %) and MC of the prepolymerized catalyst (wt %) and the Al/Zr ratio for the catalysts of metallocenes MC1 and MC2 are shown.

TABLE 2 based on ICP

| Catalyst | Al [wt %] | Zr [wt %] | Al/Zr [mol/mol] | MC (unprepped cat) [wt %] | MC (prep, cat) [wt %] |
|---|---|---|---|---|---|
| CC1 | 36.3 | 0.43 | 285 | 5.2 | 1.2 |
| IC1 | 30.6 | 0.56 | 185 | 7.9 | 1.2 |

TABLE 2-continued

| | | | based on ICP | | |
|---|---|---|---|---|---|
| Catalyst | Al [wt %] | Zr [wt %] | Al/Zr [mol/mol] | MC (unprepped cat) [wt %] | MC (prep, cat) [wt %] |
| CC2 | 36.2 | 0.41 | 298 | 4.7 | 1.1 |
| IC2 | 30.9 | 0.52 | 201 | 6.9 | 1.0 |
| CC3 | 25.8 | 0.31 | 281 | — | — |
| CC4 | 18.9 | 0.24 | 266 | — | — |

POLYMERIZATION EXAMPLES

1. Bulk Propylene Homopolymerization
a) IC1 and CC1

The polymerizations were performed in a 5 litre jacketed stainless-steel reactor equipped with a stirrer, lines for monomer and hydrogen, an exhaust line and feeding systems for catalyst and scavenger.

The catalyst feeder comprises two stainless steel cylinders in series. Inside a glovebox, desired amount of not prepolymerized (unprepped) catalyst (see Table 3) was loaded into the lower steel cylinder of the feeder and the second cylinder, containing 5 ml of dry Perfluoro-1,3-dimethylcyclohexane, was attached on top. The steel cylinder of the scavenger feeder was filled with 200 µl of triethylaluminum and 5 ml of dry pentane. Outside glovebox, the feed cylinders were attached to the reactor and the connections flushed with nitrogen. Reactor temperature was controlled to 20° C. The contents of the scavenger feeder was flushed into the reactor with nitrogen over pressure. Then, desired amount of hydrogen (see Table 3), followed by 1100 g of liquid propylene, was fed into the reactor. Stirring speed was set to 400 rpm. The reactor temperature was stabilised to 20° C. and after minimum of 5 minutes, the polymerization was started by injecting the catalyst into the reactor as described in the following. The valve between the two cylinders of the catalyst feeder was opened and the catalyst was then immediately flushed into the reactor with nitrogen over pressure. The feeder was pressurised three times with nitrogen and flushed into the reactor. Total nitrogen loading to reactor was about 0.42 mol.

After 5 minutes prepolymerization at 20° C., the reactor temperature was raised to 70° C. over a period of 15 minutes. The polymerization was continued at 70° C. for 60 minutes and then stopped by flushing the reactor to normal pressure. Polymer was collected after flushing the reactor with nitrogen several times, left to dry until constant mass was reached, and then weighed to record the yield.

The catalyst activity was calculated based on the 60 minute period according to the above defined formula.

b) CC3 and CC4

The polymerization was performed as described for polymerization examples P2 and CP2 of in WO 2014/060541 using catalysts CC3 and CC4. The polymerisations were performed in a 5 L reactor. 200 µl of triethylaluminum was fed as a scavenger in 5 mL of dry and degassed pentane. The desired amount of hydrogen was then loaded (measured in mmol) and 1100 g of liquid propylene was fed into the reactor. The temperature was set to 30° C. The desired amount of catalyst (3 to 15 mg) in 5 mL of PFC is flushed into the reactor with a nitrogen overpressure. The temperature is then raised to 70° C. over a period of 15 minutes. The polymerisation is stopped after 30 minutes by venting the reactor and flushing with nitrogen before the polymer is collected.

The catalyst activity was calculated on the basis of the 30 minutes period according to the above defined formula.

2. C3/C2 random copolymerization
a) IC1, IC2, CC1 and CC2

The polymerizations were performed in a 5 litre jacketed stainless-steel reactor equipped with a stirrer, lines for monomers and hydrogen, an exhaust line and feeding systems for catalyst and scavenger.

The catalyst feeder comprises two stainless steel cylinders in series. Inside a glovebox, desired amount of not prepolymerized (unprepped) catalyst (see Table 5) was loaded into the lower steel cylinder of the feeder and the second cylinder, containing 5 ml of dry Perfluoro-1,3-dimethylcyclohexane, was attached on top. The steel cylinder of the scavenger feeder was filled with 200 µl of triethylaluminum and 5 ml of dry pentane. Outside glovebox, the feed cylinders were attached to the reactor and the connections flushed with nitrogen. Reactor temperature was controlled to 30° C. The content of the scavenger feeder was flushed into the reactor with nitrogen over pressure. Then, desired amount of hydrogen (6 mmol), followed by 1100 g of liquid propylene and the desired amount of ethylene (see Table 5), was fed into the reactor. Stirring speed was set to 400 rpm. The reactor temperature was stabilised to 30° C. and after minimum of 5 minutes, the polymerization was started by injecting the catalyst into the reactor as described in the following. The valve between the two cylinders of the catalyst feeder was opened and the catalyst was then immediately flushed into the reactor with nitrogen over pressure. The feeder was pressurised three times with nitrogen and flushed into the reactor. Total nitrogen loading to reactor was 0.38-0.42 mol.

The reactor temperature was raised to 70° C. over a period of 15 minutes. The polymerization was continued at 70° C. for roughly 30 minutes and then stopped by flushing the reactor to normal pressure. Polymer was collected after flushing the reactor with nitrogen several times, left to dry until constant mass was reached, and then weighed to record the yield.

The catalyst activity was calculated based on the time period at 70° C. (24 to 30 minutes, Table 5) according to the above defined formula.

b) CC3 and CC4

The polymerization was performed as described for polymerization examples P2 and CP2 of in WO 2014/060540 using catalysts CC3 and CC4.

The polymerisations were performed in a 5 L reactor. 200 µl of triethylaluminum was fed as a scavenger in 5 mL of dry and degassed pentane. The desired amount of hydrogen (6 mmol) was then loaded (measured in mmol) and 1100 g of liquid propylene (purified via columns filled with copper-catalyst, molecular sieves and Selexsorb COS) was fed into the reactor. Desired amount of ethylene was fed in to the reactor. The temperature was set to 30° C. The desired amount of catalyst (3 to 30 mg) in 5 mL of PFC is flushed into the reactor with a nitrogen overpressure. The temperature is then raised to 70° C. over a period of 15 minutes. The polymerisation is stopped after 30 minutes by venting the reactor and flushing with nitrogen before the polymer is collected.

The catalyst activity was calculated on the basis of the 30 minutes period according to the above defined formula.

3. Bulk Propylene Polymerization (Prepolymerized Catalysts)

A stirred autoclave (equipped with a ribbon stirrer) with a total volume of 20.9 dm$^3$ containing 0.2 bar-g propylene is filled with additional 4.45 kg propylene. After addition of 0.8 ml triethylaluminium solution (0.62 molar solution in n-heptane) using a stream of 250 g propylene, the solution is stirred at 20° C. and 250 rpm for at least 20 min. Afterwards the catalyst is injected as described in the following.

The desired amount of solid, prepolymerized (prepped) catalyst was loaded into a 5 ml stainless steel vial inside a glovebox, then a second 5 ml vial containing 4 ml n-heptane and pressurized with 10 bars of nitrogen was added on top of it. This dual feeder system was mounted on a port on the lid of the autoclave. The chosen amount of H2 is dosed into the reactor via flow controller. The valve between the two vials is opened and the solid catalyst is contacted with n-heptane under N2 pressure for 2 s, and then flushed into the reactor with 250 g propylene. Stirring speed is held at 250 rpm and pre-polymerization is run for 10 min at 20° C. Then the polymerization temperature is increased to 75° C. The reactor temperature is held constant throughout the polymerization. The polymerization time is measured starting when the temperature is 2° C. below the set polymerization temperature. When the polymerization time of 60 min has lapsed, the reaction is stopped by injecting 5 ml ethanol, cooling the reactor and flashing the volatile components. After flushing the reactor 3 times with N2 and one vacuum/N2 cycle, the reactor is opened and the polymer powder is taken out and dried overnight in a fume hood. 100 g of the polymer is additivated with 0.5 wt % Irganox B225 (dissolved in acetone) and then dried overnight in a fume hood and additionally one hour in a vacuum drying oven at 60° C. Results are shown in Table 4.

4. 3-Step Bulk (hPP)+Gas Phase (hPP)+Gas Phase (C2/C3) Polymerization (Heterophasic Propylene Copolymer)

Step 1: Prepolymerization and Bulk Homopolymerization

A 21.2 L stainless-steel reactor containing 0.4 barg propylene was filled with 3950 g propylene. Triethylaluminum (0.80 ml of a 0.62 mol/l solution in heptane) was injected into the reactor by additional 240 g propylene. The solution was stirred at 20° C. and 250 rpm for at least 20 min. The catalyst was injected as described in the following. The desired amount of solid, prepolymerized (prepped) catalyst was loaded into a 5 ml stainless steel vial inside a glovebox and a second 5 ml vial containing 4 ml n-heptane pressurized with 10 bars of nitrogen was added on top of the first vial. This catalyst feeder system was mounted on a port on the lid of the reactor. The valve between the two vials was opened and the solid catalyst was contacted with heptane under nitrogen pressure for 2 s, then flushed into the reactor with 240 g propylene. The prepolymerization was run for 10 min. At the end of the prepolymerization step the temperature was raised to 80° C. When the internal reactor temperature has reached 71° C., 1.5 NL (CE5) or 2.0 NL (IE5) was added via mass flow controller in one minute. The reactor temperature was held constant at 80° C. throughout the polymerization. The polymerization time was measured starting when the internal reactor temperature reached 2° C. below the set polymerization temperature.

Step 2: Gas Phase Homopolymerization

After the bulk step was completed, the stirrer speed was reduced to 50 rpm and the pressure was reduced to the desired gas phase pressure. (=target pressure−0.5 bar) by venting the monomer. Afterwards the stirrer speed was set to 180 rpm, the reactor temperature to 80° C. and the pressure to 24 bar-g. Hydrogen was added via flow controller in 4 minutes. During the gas phase homopolymerization, both pressure and temperature have been held constant via mass flow controller (feeding propylene) and thermostat for 40 minutes.

Step 3: Gas Phase Ethylene Propylene Copolymerization

After the gas phase homopolymerization step was completed, the stirrer speed was reduced to 50 rpm and the pressure was reduced down to 0.3 bar-g by venting the monomers. Then triethylaluminum (0.80 ml of a 0.62 mol/l solution in heptane) was injected into the reactor by additional 250 g propylene through a steel vial. The pressure was then again reduced down to 0.3 bar-g by venting the monomers. The stirrer speed was set to 180 rpm and the reactor temperature was set to 70° C. Then the reactor pressure was increased to 20 bar-g by feeding a C3/C2 gas mixture (C2/C3=0.56 wt/wt for all). The temperature was held constant by thermostat and the pressure was held constant by feeding via mass flow controller a C3/C2 gas mixture of composition corresponding to the target polymer composition and, until the set duration for this step had lapsed.

Then the reactor was cooled down to about 30° C. and the volatile components flashed out. After purging the reactor 3 times with N2 and one vacuum/N2 cycle, the product was taken out and dried overnight in a fume hood. 100 g of the polymer is additivated with 0.5 wt % Irganox B225 (solution in acetone) and dried overnight in a hood followed by 2 hours in a vacuum drying oven at 60° C. Results are shown in Table 6 and 7.

Results:

From below Tables 3 to 7 it can be seen that the catalysts with a cocatalyst system comprising a borate cocatalyst and a MAO cocatalyst (IC1, IC2 and CC3) show increased MC activity, catalyst activity and catalyst productivity when polymerizing propylene homopolymers and propylene-ethylene random copolymers compared to the catalysts using the same metallocenes but only a MAO cocatalyst (CC1, CC2 and CC3). Catalysts with a metallocene complex according to the invention and a cocatalyst system comprising a borate cocatalyst and a MAO cocatalyst (IC1 and IC2) show increased catalyst activity when polymerizing propylene homopolymers and propylene-ethylene random copolymers compared to Catalysts with the same cocatalyst system but a comparative metallocene complex (CC3).

Further, from Tables 3 and 4 it can be seen that the propylene homopolymers polymerized in the presence of the catalysts IC1 and IC2 show a higher melting temperature compared to the propylene homopolymers polymerized in the presence of the catalysts CC1 and CC2.

Still further, from Table 5 that propylene random copolymers polymerized in the presence of the catalysts IC1 and IC2 show a higher comonomer content at comparable melting temperatures compared to the propylene random copolymers polymerized in the presence of the catalysts CC1 and CC2.

From Tables 6 and 7 it can be seen that the catalysts according to the invention (IC2) also show benefits for 3-step polymerization processes for heterophasic propylene copolymers. At similar ethylene (C2) content of about 23 wt % in the XS fraction, the inventive catalyst IC2 (i.e. borate modified catalysts) has activities that are significantly higher in both bulk and gas phase homopolymerization and maintain a quite good activity also in the second gas phase step (copolymerization).

TABLE 3

Bulk propylene homopolymerization results and polymer properties. (5-L reactor, 70° C., polymerization time 60 min (IE1, CE1) and 30 min (CE6, CE7))

| Example | Un-prepped Catalyst | Catalyst (mg) | $H_2$ (mmol) | Polymer (g) | Activity (kg-PP/g-cat/h) | MC Activity (kgPP/gMC/h) | $MFR_2$ (g/10 min) | Mw (kg/mol) | Mw/Mn | Tm (° C.) |
|---|---|---|---|---|---|---|---|---|---|---|
| CE1 | CC1 | 7.0 | 15 | 451 | 64.4 | 1231.9 | 4.13 | 326 | 3.0 | 149.1 |
| IE1 | IC1 | 4.3 | 15 | 502 | 116.7 | 1486.1 | 2.77 | 351 | 2.9 | 152.6 |
| CE6 | CC3 | 7.3 | 15 | 355 | 97.3 | | | | 2.8 | 154.4 |
| CE7 | CC4 | 12.1 | 15 | 414 | 68.4 | 2.4 | | | 2.5 | 149.1 |

TABLE 4

Bulk propylene homopolymerization results and polymer properties. (20-L reactor, 75° C., polymerization time 60 min.)

| Example | Prepped Catalyst | Catalyst (unprep.) (mg) | $H_2$ (g) | Polymer (g) | Unprep. Catalyst Activity (kg-PP/g-cat/h) | MC Activity (kgPP/gMC/h) | $MFR_2$ (g/10 min) | Mw (kg/mol) | Mw/Mn | Tm (° C.) |
|---|---|---|---|---|---|---|---|---|---|---|
| CE2 | CC2p | 24.3 | 0.1286 | 1548 | 63.7 | 1367.2 | 0.11 | 720 | 3.4 | 150.0 |
| IE2 | IC2p | 12.3 | 0.1286 | 1271 | 103.1 | 1724.3 | 0.44 | 534.5 | 3.3 | 152.5 |

TABLE 5

Propylene-ethylene random copolymerization results and polymer properties. (5-L reactor, 70° C.)

| Example | Un-prepped Catalyst | Catalyst (mg) | Ethylene (g) | Polymerization time (min) | Polymer (g) | Activity (kg-PP/g-cat/h) | MC Activity (kgPP/gMC/h) | $MFR_{21}$ (g/10 min) | $M_w$ (kg/mol) | $M_w/M_n$ | $T_m$ (° C.) | $C_2$ (NMR) (wt %) |
|---|---|---|---|---|---|---|---|---|---|---|---|---|
| CE3 | CC1 | 7.2 | 19.9 | 30 | 504 | 140 | 2678.0 | 11.9 | 726 | 2.8 | 135.5 | 1.3 |
| IE3 | IC1 | 2.7 | 20 | 27 | 470.1 | 386.9 | 4926.9 | 10.3 | 671 | 2.34 | 138.0 | 1.5 |
| CE4 | CC2 | 4.6 | 20 | 30 | 379.2 | 164.9 | 3491.5 | 11.8 | 703 | 2.8 | 137.4 | 1.5 |
| IE4 | IC2 | 3.4 | 20 | 24 | 470.4 | 345.9 | 5048.8 | 19.3 | 588 | 2.5 | 136.4 | 1.9 |
| CE8 | CC3 | 2.9 | 19.9 | 30 | 314 | 216.3 | | 27.0 | 498 | 2.3 | 140.4 | 1.6 (FTIR) |
| CE9 | CC4 | 5.1 | 19.9 | 30 | 149 | 58.5 | | 18.0 | 538 | 2.4 | 135.2 | 2.0 (FTIR) |

TABLE 6

Catalyst activities and productivities based on the unprepped catalyst together with the main polymerization conditions in 3-step process for polymerizing a heterophasic propylene copolymer. General conditions: bulk: TEA in bulk 0.5 mmol; gas phase: TEA in GP2 0.5 mmol

| | | | PREPOLY | | | | | BULK STEP | | | | |
|---|---|---|---|---|---|---|---|---|---|---|---|---|
| | | | | | | | | | | | yield | |
| Example | Prepped catalyst | prepped. cat. amount mg | Unprep. cat. amount mg | temperature °C. | res. time min | H2 NL | Time transition 20° C. to 80° C. min | total H2 NL | H2 dosing rate NL/min | temp. av. bulk °C. | res. time min | bulk (calc. via MFC) g | cat. productivity calc. mfc(bulk) kg$_{PP}$/g$_{cat}$ |
| CE5 | CC1p | 140 | 33.3 | 20 | 10 | 0.0 | 19 | 1.5 | 0.5 | 80 | 40 | 517 | 15.5 |
| IE5 | IC1p | 85 | 12.9 | 20 | 10 | 2.0 | 20 | 2.0 | 1.5 | 80 | 40 | 1361 | 105.2 |

| | BULK STEP | GP1 | | | | | | | |
|---|---|---|---|---|---|---|---|---|---|
| Example | cat. activity calc. mfc(bulk) kg$_{PP}$/g$_{cat}$/h | H2 in GP NL | GP C3H6 feed (MFC) g | Temp. °C. | Ptotal av. barg | time min | Yield (calc. from MFC) g | cat. productivity calc.with mfc kg$_{PP}$/g$_{cat}$ | cat.activity calc.with mfc kg$_{PP}$/g$_{cat}$/h |
| CE5 | 23.3 | 1,600 | 447 | 80 | 24 | 40 | 447 | 13.4 | 20.1 |
| IE5 | 157.8 | 2,013 | 381 | 80 | 24 | 40 | 381 | 29.4 | 44.2 |

| | Transition GP1 --> GP2 | | | | GP2 (C2/C3) | | | | |
|---|---|---|---|---|---|---|---|---|---|
| Example | Time-transition Bulk-GP min | C3H6-feed transition (MFC) g | C2H4-feed transition (MFC) g | feed C2/C3 during transition wt/wt | Ptotal av. barg | H2 added in GP ln | Temp GP °C. | res. time GP. min | GP-C3H6 feed (MFC) g |
| CE5 | 15 | 390 | 221 | 0.57 | 20 | 0 | 70 | 120 | 203 |
| IE5 | 9 | 383 | 213 | 0.56 | 20 | 0 | 70 | 120 | 290 |

| | GP2 (C2/C3) | | | | |
|---|---|---|---|---|---|
| Example | GP-C2H4 feed (MFC) g | feed C2/C3 wt GP | yield in GP (calculated with MFC) g | cat.product.GP2 calc.with mfc kg/g$_{cat}$ | cat.activity.GP2 calc.with mfc kg/g$_{cat}$/h |
| CE5 | 51 | 0.25 | 279 | 8.4 | 4.2 |
| IE5 | 73 | 0.25 | 363 | 28.1 | 14.0 |

TABLE 7

Polymer characterisation of 3-step process for polymerizing a heterophasic propylene copolymer

| | RESULTS TOTAL | | | | | | | | ANALYSIS SOLUBLE FRACTION | |
|---|---|---|---|---|---|---|---|---|---|---|
| Example | yield total g | catalyst productivity kg/g$_{cat}$ | MFR2 powder g/10 min | Powder bulk density g/ml | Soluble fraction (Crystex) wt % | iV (Crystex) dL/g | C2 total (Crystex) wt % | Tm °C. | Tc °C. | iV of the soluble fraction dL/g | C2 content of the XS faction wt % |
| CE5 | 1243 | 37 | 4.2 | 0.4 | 22 | 2.6 | 5.6 | 150 | 113 | 2.9 | 22.9 |
| IE5 | 2105 | 163 | 2.5 | 0.3 | 17 | 2.8 | 3.6 | 152 | 114 | 2.5 | 23.1 |

The invention claimed is:

1. A process for polymerizing propylene monomers together with ethylene comonomers, the process comprising:
polymerizing propylene monomers together with ethylene comonomers in the presence of a single-site catalyst comprising:
(i) a complex of formula (I):

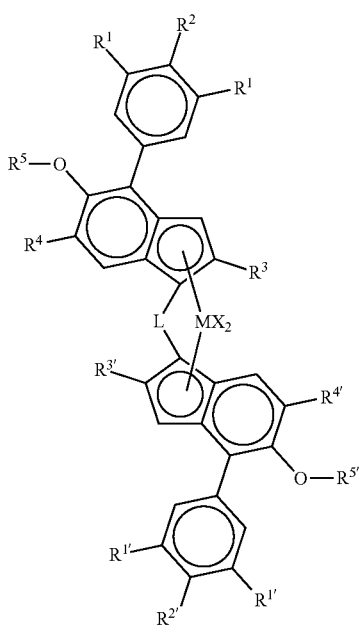

wherein,
M is zirconium or hafnium;
each X independently is a sigma-donor ligand,
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing fluorine atoms, or optionally two R' groups taken together can form a ring;
R$^1$ and R$^{1'}$ are each independently hydrogen, C$_5$-C$_{10}$-aryl or a group —CH(R$^x$)$_2$ wherein each R$^x$ is independently H or a C$_1$-C$_{10}$ hydrocarbyl group, and optionally the two R$^x$ taken together can form a ring,
R$^2$ and R$^{2'}$ are each independently hydrogen, C$_5$-C$_{10}$-aryl or a group —C(R$^y$)$_3$ wherein each R$^y$ is independently H or a C$_{1-10}$ hydrocarbyl group, or optionally two or three R$^y$ groups taken together can form a ring,
whereby at least one of R$^1$ or R$^2$ and one of R$^{1'}$ or R$^{2'}$ is different from hydrogen, and
whereby R$^2$ together with one of R$^1$, as well as R$^{2'}$ together with one of R$^{1'}$ can be part of a further mono- or multicyclic ring condensed to the phenyl ring,
R$^3$ and R$^{3'}$ are each independently a linear C$_1$ to C$_6$ hydrocarbyl group or a branched or cyclic C$_4$ to C$_{10}$ hydrocarbyl group, whereby the groups are not branched in α-position,
R$^4$ and R$^{4'}$ are each independently a tertiary C$_4$ to C$_{10}$ hydrocarbyl group,
R$^5$ and R$^{5'}$ are each independently a linear or branched C$_1$ to C$_{10}$ alkyl group or an C$_5$-C$_{10}$-aryl group, and (ii) a cocatalyst system comprising a boron containing cocatalyst and an aluminoxane cocatalyst,
wherein the process is a multistage process comprising at least two reactors connected in series including at least one gas phase polymerization step.

2. The process according to claim 1, wherein the aluminoxane cocatalyst is one of formula (X):

wherein n is from 6 to 20 and R is selected from a C$_1$-C$_{10}$ alkyl, C$_3$-C$_{10}$ cycloalkyl, C$_7$-C$_{12}$ arylalkyl or alkylaryl and/or phenyl or naphthyl.

3. The process according to claim 1, wherein the boron based cocatalyst is one of formula (Z):

wherein Y independently is the same or can be different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine.

4. The process according to claim 1, wherein the boron based cocatalyst is one of compounds containing a borate anion.

5. The process according to claim 1, wherein the molar ratio of boron in the boron containing cocatalyst to the metal ion M in the complex of formula (I) is in the range of 0.5:1 to 10:1 mol/mol.

6. The process according to claim 1, wherein the molar ratio of aluminium in the aluminoxane cocatalyst to the metal ion M in the complex of formula (I) is in the range of 1:1 to 2000:1 mol/mol.

7. The process according to claim 1, comprising the steps of:
a) introducing propylene monomer units, ethylene comonomer units and optionally hydrogen into a polymerization reactor;
b) polymerizing the propylene monomer units and ethylene units to form a polymer of propylene which is a random copolymer of propylene and ethylene.

8. The process according to claim 1, wherein the single-site catalyst has an metallocene (MC) activity of at least 1000 kg/(g·h).

9. The process according to claim 1, comprising the steps of:
(A') polymerizing in a first reactor propylene monomer units and optionally ethylene comonomer units in the presence of hydrogen for obtaining a first propylene homopolymer fraction (hPP1) or a first propylene-ethylene random copolymer fraction (cPP1),
(B') transferring said first propylene homopolymer fraction (hPP1) or first propylene-ethylene random copolymer fraction (cPP1) in a second reactor,
(C') polymerizing in said second reactor in the presence of the first propylene homopolymer fraction (hPP1) or first propylene-ethylene random copolymer fraction (cPP1) propylene monomer units and optionally ethylene comonomer units in the presence of hydrogen for obtaining a second propylene homopolymer fraction (hPP2) or a second propylene-ethylene random copolymer fraction (cPP2), said first propylene homopolymer fraction (hPP1) or first propylene-ethylene random copolymer fraction (cPP1) and said second propylene homopolymer fraction (hPP2) a second propylene-ethylene random copolymer fraction (cPP2) forming the matrix phase (M), (D') transferring said matrix phase (M) into a third reactor, said third reactor being a gas phase reactor, (E') polymerizing in said third reactor in the presence of the matrix (M) propylene monomer units and ethylene comonomer units for obtaining an elastomeric propylene copolymer (E), wherein said matrix (M) and said elastomeric propylene copolymer (E) form the heterophasic propylene copolymer.

10. A process for the production of a polymer of propylene, which is a random copolymer of propylene and ethylene or a heterophasic propylene copolymer and comprises a homopolymer of propylene or a random copolymer of propylene and ethylene, the process comprising:
  polymerizing propylene monomers together with ethylene comonomers in the presence of a single-site catalyst comprising:
  (i) a complex of formula (I):

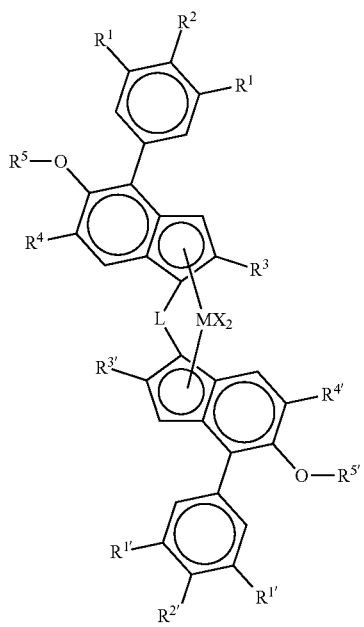

(I)

wherein
M is zirconium or hafnium;
each X independently is a sigma-donor ligand
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing fluorine atoms, or optionally two R' groups taken together can form a ring;
$R^1$ and $R^{1'}$ are each independently hydrogen, C$_5$-C$_{10}$-aryl or a group —CH(R$^x$)$_2$ wherein each R$^x$ is independently H or a C$_{1-10}$ hydrocarbyl group, and optionally the two R$^x$ taken together can form a ring,
$R^2$ and $R^{2'}$ are each independently hydrogen, C$_5$-C$_{10}$-aryl or a group —C(R$^y$)$_3$ wherein each R$^y$ is independently H or a C$_{1-10}$ hydrocarbyl group, or optionally two or three R$^y$ groups taken together can form a ring
whereby at least one of $R^1$ or $R^2$ and one of $R^{1'}$ or $R^{2'}$ is different from hydrogen and
whereby $R^2$ together with one of $R^1$, as well as $R^{2'}$ together with one of $R^{1'}$ can be part of a further mono- or multicyclic ring condensed to the phenyl ring
$R^3$ and $R^{3'}$ are each independently a linear C$_1$ to C$_6$ hydrocarbyl group or a branched or cyclic C$_4$ to C$_{10}$ hydrocarbyl group, whereby the groups are not branched in α-position
$R^4$ and $R^{4'}$ are each independently a tertiary C$_4$ to C$_{10}$ hydrocarbyl group
$R^5$ and $R^{5'}$ are each independently a linear or branched C$_1$ to C$_{10}$ alkyl group or an C$_5$-C$_{10}$-aryl group and
(ii) a cocatalyst system comprising a boron containing cocatalyst and an aluminoxane cocatalyst,
wherein the process is a multistage process comprising at least two reactors connected in series including at least one gas phase polymerization step.

11. A polymer of propylene obtainable from the process according to claim 1, which is a random copolymer of propylene and ethylene or a heterophasic propylene copolymer comprising a homopolymer of propylene or a random copolymer of propylene and ethylene.

12. The polymer of propylene according to claim 11, wherein the homopolymer of propylene has a melting temperature Tm of at least 150.0° C.

13. The polymer of propylene according to claim 11, wherein the polymer of propylene is a heterophasic propylene copolymer comprising a matrix (M) comprising the homopolymer of propylene and/or the random copolymer of propylene and ethylene, and an elastomeric copolymer (E) dispersed in the matrix (M).

* * * * *